US012722779B2

(12) United States Patent
Plemons et al.

(10) Patent No.: US 12,722,779 B2
(45) Date of Patent: Sep. 1, 2026

(54) MODULAR MAGAZINES FOR COUNTERMEASURE DISPENSING SYSTEM AND METHODS OF USE

(71) Applicant: BAE Systems Information and Electronic Systems Integration Inc., Nashua, NH (US)

(72) Inventors: Danny L. Plemons, Austin, TX (US); Jeffrey A. Gensler, Austin, TX (US); Steven L. Dyer, Tyngsborough, MA (US); Christopher E. Kohl, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 18/979,111

(22) Filed: Dec. 12, 2024

(65) Prior Publication Data

US 2026/0167331 A1 Jun. 18, 2026

(51) Int. Cl.
*F42B 12/70* (2006.01)
*B64D 1/02* (2006.01)

(52) U.S. Cl.
CPC ................ *B64D 1/02* (2013.01); *F42B 12/70* (2013.01)

(58) Field of Classification Search
CPC .............. F42B 12/70; B64D 1/02; B64D 1/12
See application file for complete search history.

(56) References Cited

U.S. PATENT DOCUMENTS

| | | | | |
|---|---|---|---|---|
| 5,115,711 A * | 5/1992 | Bushagour | F41F 3/042 89/1.816 |
| 12,286,230 B2 * | 4/2025 | Kohl | B64D 1/02 |
| 2022/0397360 A1 * | 12/2022 | Plemons | F41F 3/065 |
| 2023/0031637 A1 * | 2/2023 | Milliorn, Jr. | F42B 5/15 |

FOREIGN PATENT DOCUMENTS

| | | | |
|---|---|---|---|
| EP | 1 873 474 * | 2/2008 | F41F 3/042 |

* cited by examiner

*Primary Examiner* — J. Woodrow Eldred
(74) *Attorney, Agent, or Firm* — Sand, Sebolt & Wernow LPA; Gary McFaline

(57) ABSTRACT

A modular magazine of a countermeasure dispensing system. The modular magazine includes a main body, a pair of horizontal walls of the main body, a pair of vertical walls of the main body that extends between the pair of horizontal walls, and a set of partitions removably engageable with the main body at the pair of horizontal walls or at the pair of vertical walls. Each partition of the set of partitions is also adapted to support a set of countermeasure expendables inside of the main body. The modular magazine may also include one or more sets of compartments collectively defined by the pair of horizontal walls, the pair of vertical walls, and the set of partitions.

20 Claims, 17 Drawing Sheets

60
60
60
60
70
50
70
50
70
40
70
60
32k
32i
32b
32d
32c
32h
32j
32g
32i
32h
32f
30,32

60b
40,60
60f
SEE FIG.6A 60c
62
64
62c
60e
60d
60a
64
62
62a
62b
62c
62a
60c
60a
60d 70b
40,70
70f
70c
70e 72
70d
72
70a 32a
32j-3
32k
32j-1
32j-2
32j-1
32j
30,32

SEE FIG.8B
32h
32f
32a
32h
32g
32i
32j
32k
32c
32e
32d
30,32

MODULAR MAGAZINES FOR COUNTERMEASURE DISPENSING SYSTEM AND METHODS OF USE

TECHNICAL FIELD

The present disclosure relates to modular magazines for storing various types of countermeasure expendables in countermeasure dispensing systems.

BACKGROUND ART

In current military technologies, military platforms, such as a military aircraft, include at least one CMDS. The CMDS dispenses countermeasure expendables (i.e., chaff material, flares or advanced smart expendables) from the platform in order to counter a detected incoming threat, such as a missile, and redirect such incoming threat away from the platform. In a conventional CMDS, such as an AN/ALE-47 CMDS used on an aircraft, the CMDS generally includes a cockpit control unit, a programmer, one or more sequencer units and up to two dispensers per sequencer. Each countermeasure dispenser in a CMDS is electrically connected to a sequencer unit for dispensing the countermeasure expendables from a magazine during countermeasure operations.

However, countermeasure magazines used in conventional CMDSs have various limitations that reduce expansion and countermeasure capabilities. In one example, countermeasure magazines used in conventional CMDSs are generally limited to carrying thirty (30) countermeasure expendables based on the capabilities of the sequencer unit and the dispenser. In another example, countermeasure magazines used in conventional CMDSs are generally limited to the type or size of countermeasure expendables that may be loaded into the magazines. As such, conventional countermeasure magazines have fixed or permanent configurations for main body a specific type or size of countermeasure expendables. With such configurations, military entities or personal that use such magazines in CMDSs must have multiple various of magazines on hand in order to use various types of sizes of countermeasure expendables for a given military operation, which, inevitably, increases costs of purchasing and storing such various magazines.

SUMMARY OF THE INVENTION

The presently disclosed modular magazines provide military entities and personal with the flexibility and capabilities to arrange and configure magazines in the battlefield. The presently disclosed modular magazines include sets or groups of partitions or dividers that are removably engageable with the magazines for customizing the desired configuration based on the countermeasure expendables that are intended to be loaded into the magazines for countermeasure operations. The presently disclosed modular magazines also enable operators or technicians to quickly swap and change the configurations of the magazines "on the fly" without the need of additional tools or steps of acquiring another magazine for specific countermeasure operations.

In one aspect, an exemplary embodiment of the present disclosure may provide a modular magazine of a countermeasure dispensing system. The modular magazine includes a main body; a pair of horizontal walls of the main body; a pair of vertical walls of the main body that extends between the pair of horizontal walls; and a set of partitions removably engageable with the main body at the pair of horizontal walls or the pair of vertical walls; wherein each partition of the set of partitions is adapted to support a set of countermeasure expendables inside of the main body.

This exemplary embodiment or another exemplary embodiment may further include a set of compartments collectively defined by the pair of horizontal walls, the pair of vertical walls, and the set of partitions. This exemplary embodiment or another exemplary embodiment may further include that each compartment of the set of compartments defines a same width and a same height. This exemplary embodiment or another exemplary embodiment may further include a first group of compartments of the set of compartments, wherein each compartment of the first group of compartments is defined by a first width and a first height; and a second group of compartments of the set of compartments, wherein each compartment of the second group of compartments is defined by a second width this greater than the first width and a second height that is equal to the first height. This exemplary embodiment or another exemplary embodiment may further include a first group of compartments of the set of compartments, wherein each compartment of the first group of compartments is defined by a first width and a first height; a second group of compartments of the set of compartments, wherein each compartment of the second group of compartments is defined by a second width this greater than the first width and a second height that is equal to the first height; and a third group of compartments of the set of compartments, wherein each compartment of the third group of compartments is defined by a third width this greater than the second width and a third height that is greater than the second height. This exemplary embodiment or another exemplary embodiment may further include that the main body comprises: a set of first grooves defined in the pair of horizontal walls of the main body; wherein at least one set of partitions of the set of partitions is removably engageable with the main body at the set of first grooves. This exemplary embodiment or another exemplary embodiment may further include that the main body further comprises: a set of second grooves defined in the pair of vertical walls of the main body; wherein at least another set of partitions of the set of partitions is removably engageable with the main body at the set of second grooves. This exemplary embodiment or another exemplary embodiment may further include that the main body is formed of fiberglass, carbon fiber, aluminum or any combination thereof.

In another aspect, an exemplary embodiment of the present disclosure may provide a modular magazine of a countermeasure dispensing system. The modular magazine includes a main body; a pair of horizontal walls of the main body; a pair of vertical walls of the main body that extends between the pair of horizontal walls; at least one divider fixedly engaged with the pair of horizontal walls or the pair of vertical walls; and a set of partitions removably engageable with the main body at one or more of the pair of horizontal walls, the pair of vertical walls, and the at least one divider; wherein each partition of the set of partitions is adapted to support a set of countermeasure expendables.

This exemplary embodiment or another exemplary embodiment may further include a set of compartments collectively defined by the pair of horizontal walls, the pair of vertical walls, and the set of partitions. This exemplary embodiment or another exemplary embodiment may further include that each compartment of the set of compartments defines a same width and a same height. This exemplary embodiment or another exemplary embodiment may further include a first group of compartments of the set of compartments, wherein each compartment of the first group of compartments is defined by a first width and a first height;

and a second group of compartments of the set of compartments, wherein each compartment of the second group of compartments is defined by a second width this greater than the first width and a second height that is equal to the first height. This exemplary embodiment or another exemplary embodiment may further include a first group of compartments of the set of compartments, wherein each compartment of the first group of compartments is defined by a first width and a first height; a second group of compartments of the set of compartments, wherein each compartment of the second group of compartments is defined by a second width this greater than the first width and a second height that is equal to the first height; and a third group of compartments of the set of compartments, wherein each compartment of the third group of compartments is defined by a third width this greater than the second width and a third height that is greater than the second height. This exemplary embodiment or another exemplary embodiment may further include that the main body comprises: a set of first grooves defined in the pair of horizontal walls of the main body; wherein at least one set of partitions of the set of partitions is removably engageable with the main body at the set of first grooves. This exemplary embodiment or another exemplary embodiment may further include that the main body further comprises: a set of second grooves defined in the pair of vertical walls of the main body; wherein at least another set of partitions of the set of partitions is removably engageable with the main body at the set of second grooves. This exemplary embodiment or another exemplary embodiment may further include the main body is formed of fiberglass, carbon fiber, aluminum or any combination thereof.

In yet another aspect, an exemplary embodiment of the present disclosure may provide a modular magazine kit for a countermeasure system, comprising: a main body; a pair of horizontal walls of the main body; a pair of vertical walls of the main body that extends between the pair of horizontal walls; a set of partitions removably engageable with the main body at the pair of horizontal walls or the pair of vertical walls, the set of partitions comprising: a first group of partitions removably engageable with the pair of horizontal walls; and a second group of partitions removably engageable with at least the pair of vertical walls; wherein each partition of the set of partitions is adapted to support a set of countermeasure expendables inside of the main body.

This exemplary embodiment or another exemplary embodiment may further include that the main body comprises: a set of first grooves defined in the pair of horizontal walls of the main body; wherein the first group of partitions of the set of partitions is removably engageable with the main body at the set of first grooves. This exemplary embodiment or another exemplary embodiment may further include that the main body comprises: a set of second grooves defined in the pair of vertical walls of the main body; wherein the second group of partitions of the set of partitions is removably engageable with the main body at the set of second grooves. This exemplary embodiment or another exemplary embodiment may further include that the main body is formed of fiberglass, carbon fiber, aluminum or any combination thereof.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
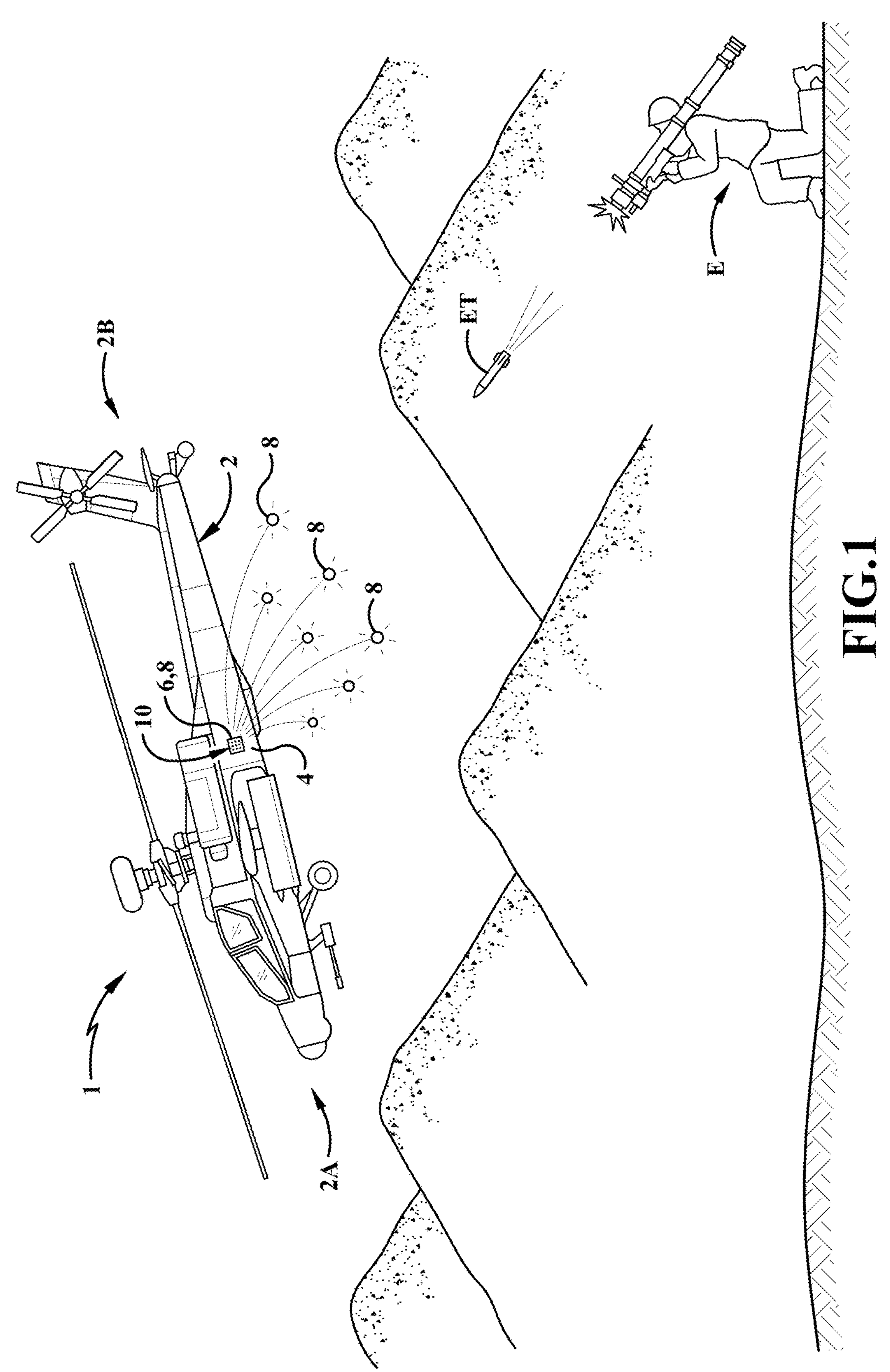
FIG. 1 is a diagrammatic view of a platform equipped with a countermeasure dispensing system (CMDS) for deterring an enemy threat, wherein the CMDS includes an modular magazine in accordance with one aspect of the present disclosure.

FIG. 1 illustrates a platform 1 such as a vehicle, ship or aircraft, which may be manned or unmanned, that includes a main body 2. As used herein, aircraft refers to fixed and rotary wing aircraft as well as UAVs and satellites. The main body 2 has a front end 2A and a rear end 2B longitudinally opposite to the front end 2A. It should be understood that the directions of "front," "rear," "top," "bottom," "right," and "left" are only used as a directional reference for the main body 2 and its associated components and/or parts described herein and illustrated in FIG. 1.

Figure 2:
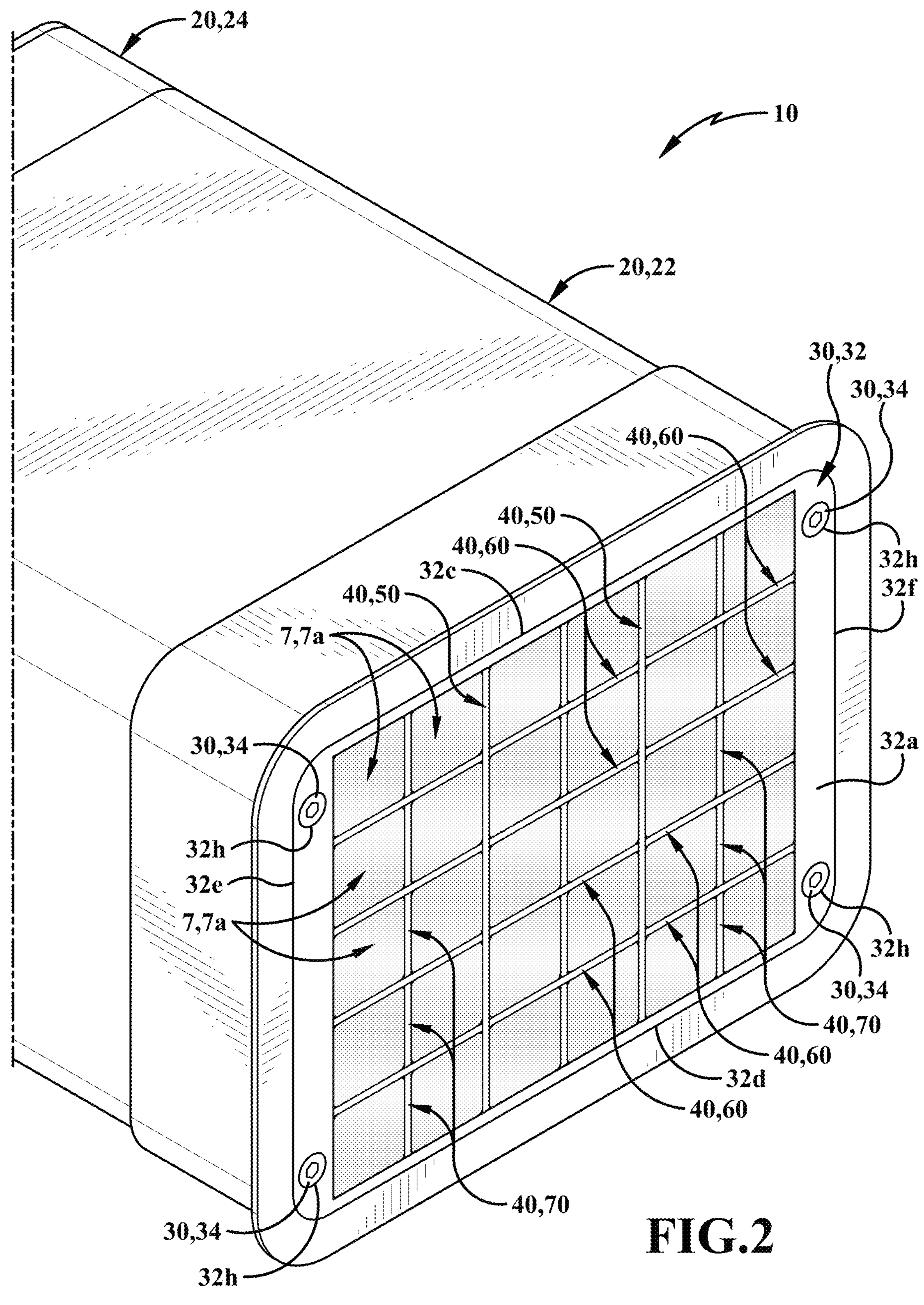
FIG. 2 is a partial front, top, first side isometric perspective view of the modular magazine loaded inside of a dispenser of the CMDS shown in FIG. 1.

The platform 1 in this example is an aircraft and includes a sidewall 4 that extends longitudinally between the front end 2A of the main body 2 and the rear end 2B of the main body 2. The sidewall 4 defines an opening 6 that is disposed between the front and rear ends 2A, 2B of the main body 2 providing access to a chamber 8. The opening 6 and the chamber 8 defined by the sidewall 4 is sized and configured to receive a countermeasure dispensing system 10 ("CMDS"). The CMDS 10 operably engages with the sidewall 4 of the main body 2 to mechanically fix the CMDS 10 to the platform 1. As illustrated in FIG. 2, the CMDS 10 is in line with the sidewall 4 of the main body 2 such that the CMDS 10 is even and/or flush with the mold line of the platform 1 to create a continuous, uninterrupted surface for aerodynamic purposes.

Prior to military operation or an aerial mission of the platform 1, the CMDS is pre-loaded with a sets of expendables 7. Each expendable of the sets of expendables 7 is loaded with flare and/or chaff material 9 for countermeasure purposes. In addition, each expendable of the sets of expendables 7 includes an impulse cartridge (not illustrated) for detonating and dispensing the expendable from the platform 1. During military operation, the flare and/or chaff material 9 provides a distraction to an incoming enemy threat or projectile "ET", initiated by an enemy "E", where the incoming enemy threat "ET" is diverted to the flare and/or chaff material 9 while allowing the platform 1 to remain unscathed. During military operation or an aerial mission, the platform 1 may receive a warning from an on-board electronic warfare (EW) system regarding the incoming enemy threat "ET" approaching the platform 1. Upon a determination made by the on-board EW system and/or an operator, the CMDS 10 dispenses a calculated amount of expendables of the sets of expendables 7 that are disposed underneath, behind, or to the side of the platform 1. In addition, the CMDS 10 may also be provided along any suitable location of the platform 1 other than sidewall 4 of the main body 2. In one exemplary embodiment, a CMDS may be provided within a wing of an aircraft. In another exemplary embodiment, a CMDS may be provided in a fuselage or a pod disposed on an aircraft.

It should be understood that the CMDS 10 is logically powered and controlled by an on-board system. The system may include suitable devices and apparatuses that are operably engaged with one another to logically control and power the CMDSs (such as CMDS 10) described and illustrated herein. In the illustrated embodiments, CMDSs described and illustrated herein may be logically powered and controlled by a legacy on-board system retaining a majority of legacy devices and apparatuses that are operably engaged with and in communication with one another. Examples of legacy devices and apparatuses that may be provided in this system include, but not limited to, a cockpit interface, discrete components, serial buses, a programmer, and data links. In another instance, a CMDS described and illustrated herein may be logically powered and controlled by a new on-board system having new devices and apparatuses that are operably engaged with one another.

Moreover, it will be understood that the on-board system may also retain and use legacy components of legacy CMDSs currently available. In one instance, a CMDS described and illustrated herein may maintain a legacy dispenser along with a legacy wiring harness operably engaging the CMDS with the legacy on-board system. In another instance, a CMDS described and illustrated herein may only maintain a legacy wiring harness operably engaging the CMDS with the legacy on-board system. Furthermore, it will be understood that CMDSs described and illustrated herein may also use new components that are not legacy to an aircraft nor a legacy on-board system provided on the aircraft. Such use of legacy and/or new components of CMDSs are described in further details below.

CMDS 10 includes a dispenser assembly 20 that operably engages with the main body 2 of platform 1 inside of the chamber 8. In operation, dispenser assembly 20 is operable to communicate with a sequencer (not illustrated) of CMDS 10 to eject one or more countermeasure expendables of the sets of expendables 7 from the dispenser assembly 20. Such features and components of dispenser assembly 20 are now discussed in greater detail below.

Dispenser assembly 20 includes a main body 22 (see FIG. 2) that operably engages with the platform 1 inside of the chamber 8 defined in the sidewall 4. It should be understood that main body 22 may also be referred to as "dispenser" or "dispenser bucket" herein. The main body 22 is configured to receive and house a magazine of CMDS discussed and illustrated herein that is loaded with the set of countermeasure expendables 7. It should be understood that main body 22 may be any suitable main body, bucket, or dispenser of an existing CMDS or CMDS that is not available of the present filing date. In one exemplary embodiment, the main body 22 may be a legacy AN/ALE-47 dispenser used in a standard AN/ALE-47 CMDS.

Dispenser assembly 20 includes a breechplate assembly 24 that operably engages with the main body 22. Particularly, the breechplate assembly 24 operably engages with a rear wall of the main body 22 of the dispenser assembly 20. In the present disclosure, the breechplate assembly 24 in configured with a finite number of firing lines and a matching number of fire pins to ignite and eject one or more countermeasure expendables of the plurality of countermeasure expendables 7 during a military operation. It should be noted that breechplate assembly 24 is also operable with a sequencer of CMDS 10 in order to ignite and eject one or more countermeasure expendables of the plurality of countermeasure expendables 7 during a military operation.

Figure 3:
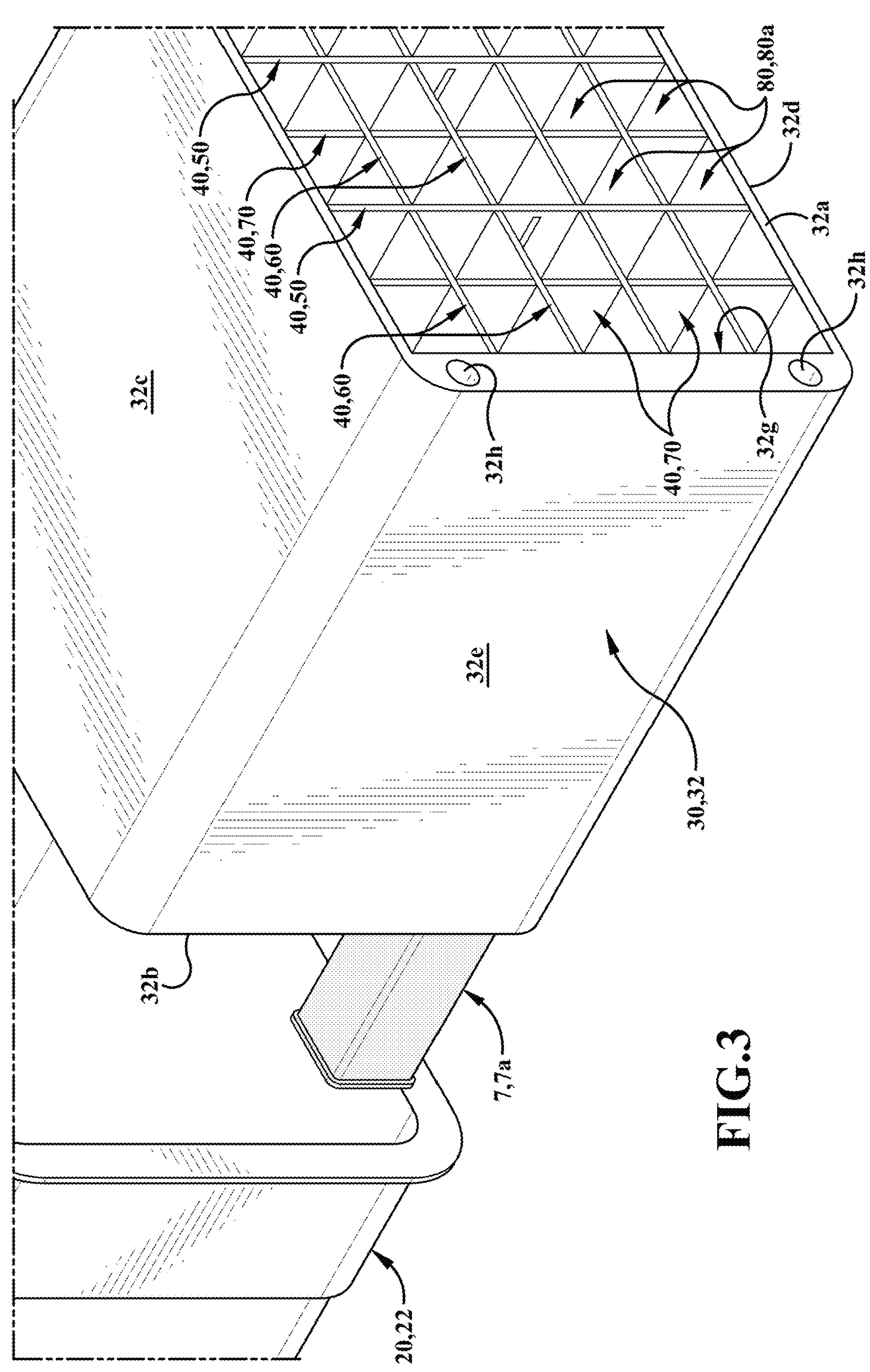
FIG. 3 is a partial exploded view of the dispenser and the magazine shown in FIG. 2, wherein a countermeasure expendable of a plurality of countermeasure expendables is partially removed from the magazine.
Figure 4:
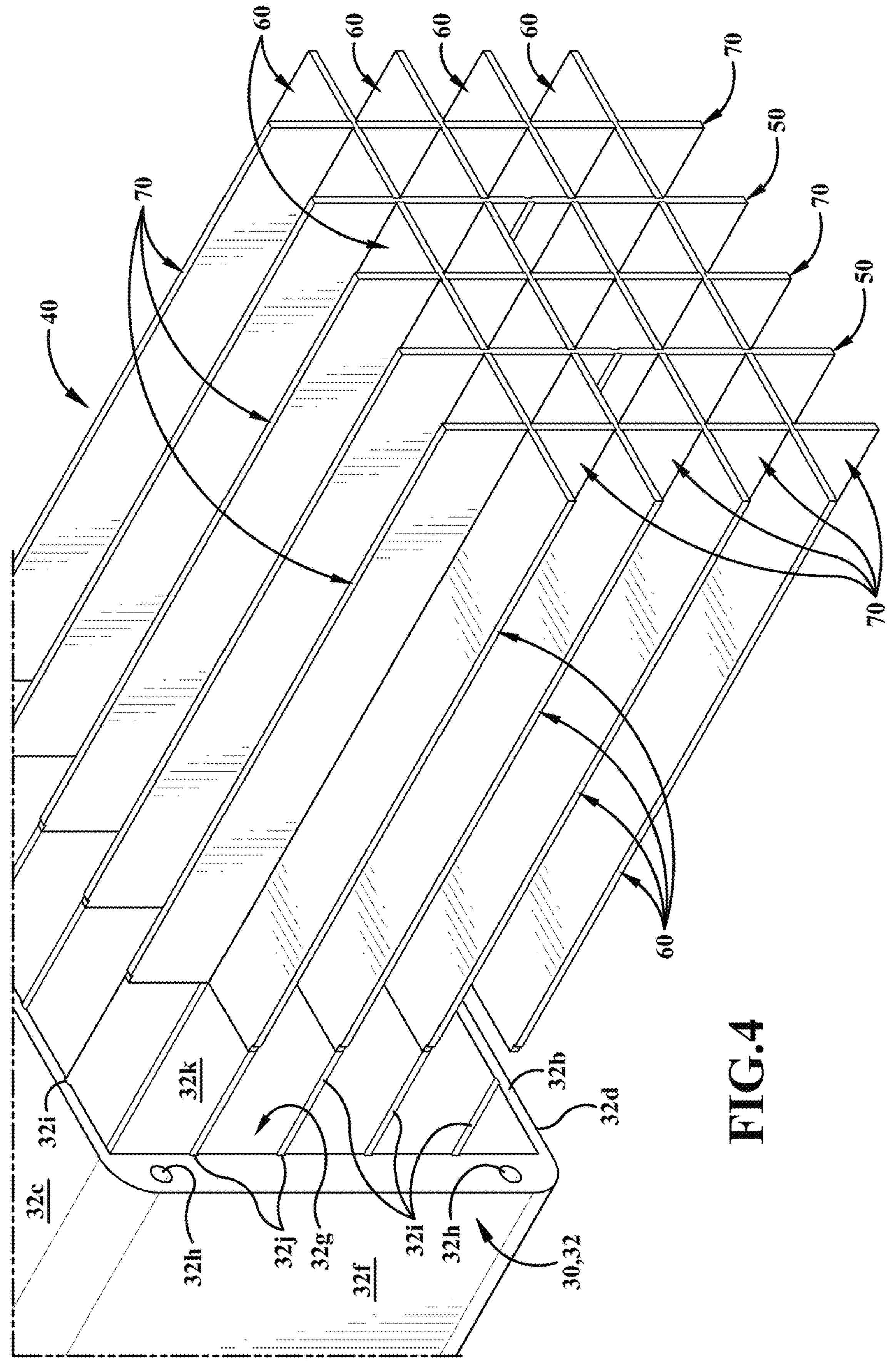
FIG. 4 is a partial rear exploded view of a main body of the modular magazine and a set of partitions of the modular magazine.

Referring to FIGS. 2-3, CMDS 10 also includes a magazine 30 that operably engages with the dispenser assembly 20. In the present disclosure, the magazine 30 is fully contained inside of the main body 22 of dispenser assembly 20 in which the magazine 30 is even with the sidewall 4 or interior to the sidewall 4. Such components and parts that make up the magazine 30 are now described in more detail below.

Referring to FIGS. 2-3, magazine 30 includes a main body 32 that includes a front wall 30*a* that faces in the same direction of a front wall or flange of main body 22, a rear wall 30*b* that is longitudinally opposite to the front wall 30*a* and faces in the same direction of the rear wall of main body 22, and a longitudinal axis defined therebetween. Main body 32 also includes a pair of horizontal walls 32*c*, 32*d* that extends between the front wall 32*a* and the rear wall 32*b*. The pair of horizontal walls 32*c*, 32*d* includes a top wall 32*c* and a bottom wall 32*d* that are spaced apart from and are parallel to one another. Main body 32 also includes a pair of vertical walls or side walls 32*e*, 32*f* that extends between the front wall 30*a* and the rear wall 30*b*. The pair of side walls 32*e*, 32*f* includes a first side wall 32*e* and a second side wall 32*f* that are spaced apart from and are parallel to one another.

Figures 8A, 8B:
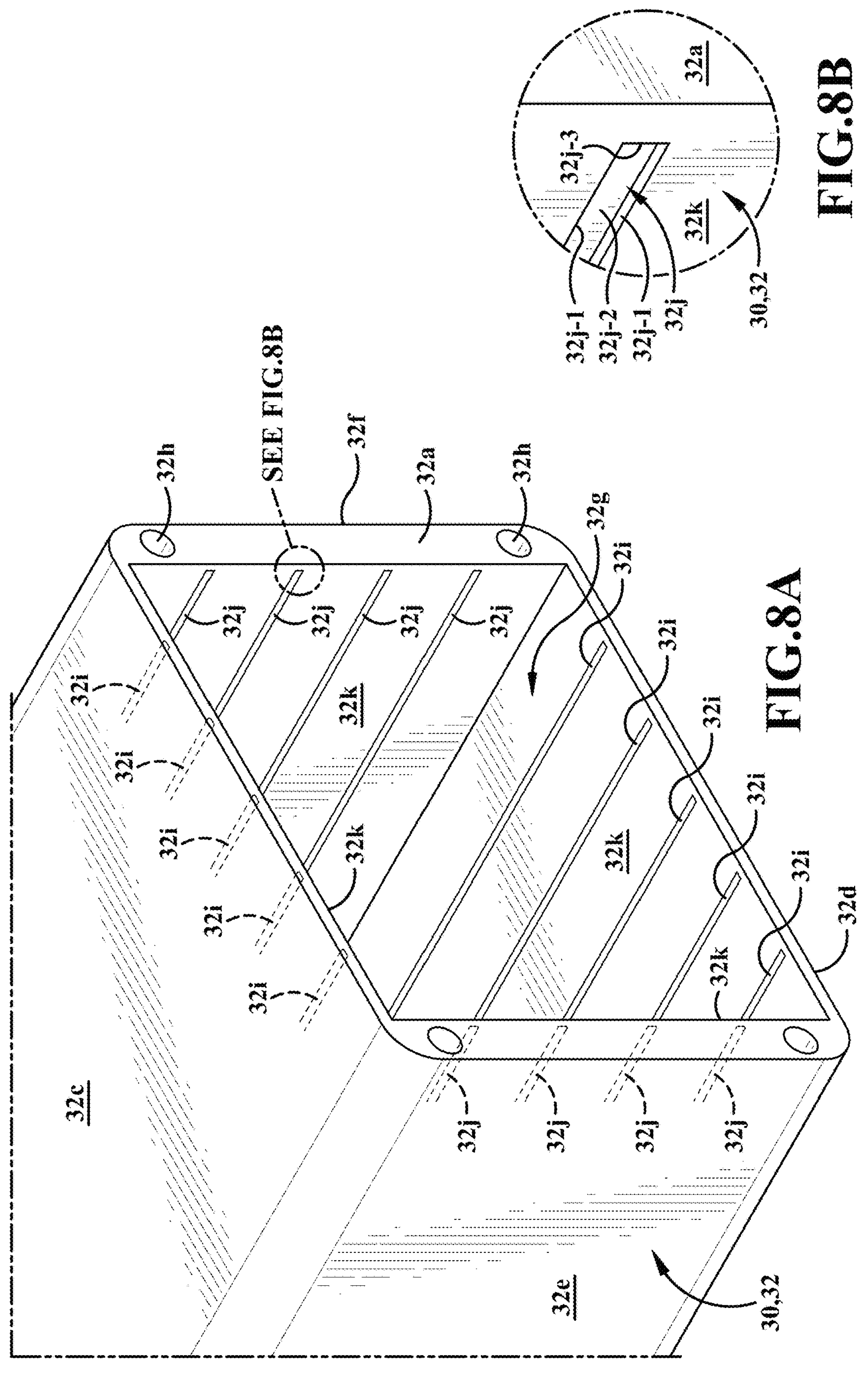
FIG. 8A is a top, front, first side elevation view of the modular magazine shown in FIG. 2.
FIG. 8B is an enlarged view of the highlighted region shown in FIG. 8A.

Still referring to main body 32, main body 32 also defines a chamber 32*g*. As best seen in FIG. 8A, the chamber 32*g* is defined, collectively, by the rear wall 32*b*, the top wall 32*c*, the bottom wall 32*d*, and the pair of side walls 32*e*, 32*f*. As discussed in greater detail below, a set of partitions is configured to engage with the main body 32 inside of the chamber 32*g* to hold the set of countermeasure expendables 7 for countermeasure operations.

Still referring to main body 32, main body 32 also defines a set of attachment openings 32*h* (see FIG. 8A). In this embodiment, each attachment opening of the set of attachment openings 32*h* is defined between the front wall 32*a* and the rear wall 32*b* such that the front wall 32*a* and the rear wall 32*b* are in fluid communication with one another at each attachment opening of the set of attachment openings 32*h*. The set of attachment openings 32*h* is used to receive connectors 34 to engage the main body 32 and the dispenser 20 with one another so that the main body 32 remains inside of the dispenser 20 during flight.

Still referring to main body 32, main body 32 also defines a set of first grooves 32*i* and a set of second grooves 32*j*. As best seen in FIG. 8A, the first set of grooves 32*i* is defined in an interior surface 32*k* of each wall of the pair of horizontal walls, particularly the top wall 32*c* and the bottom wall 32*d*, inside of the chamber 32*g*. Similarly, and as best seen in FIG. 8A, the second set of grooves 32*j* is defined in the interior surface 32*k* each wall of the pair of side walls, particularly the first side wall 32*e* and the second side wall 32*f*, inside of the chamber 32*g*. It should be understood that the interior surface 32*k* is collectively defined by the pair of horizontal walls 32*c*, 32*d*, and the pair of vertical walls 32*e*, 32*f*.

Figures 8C, 8D:
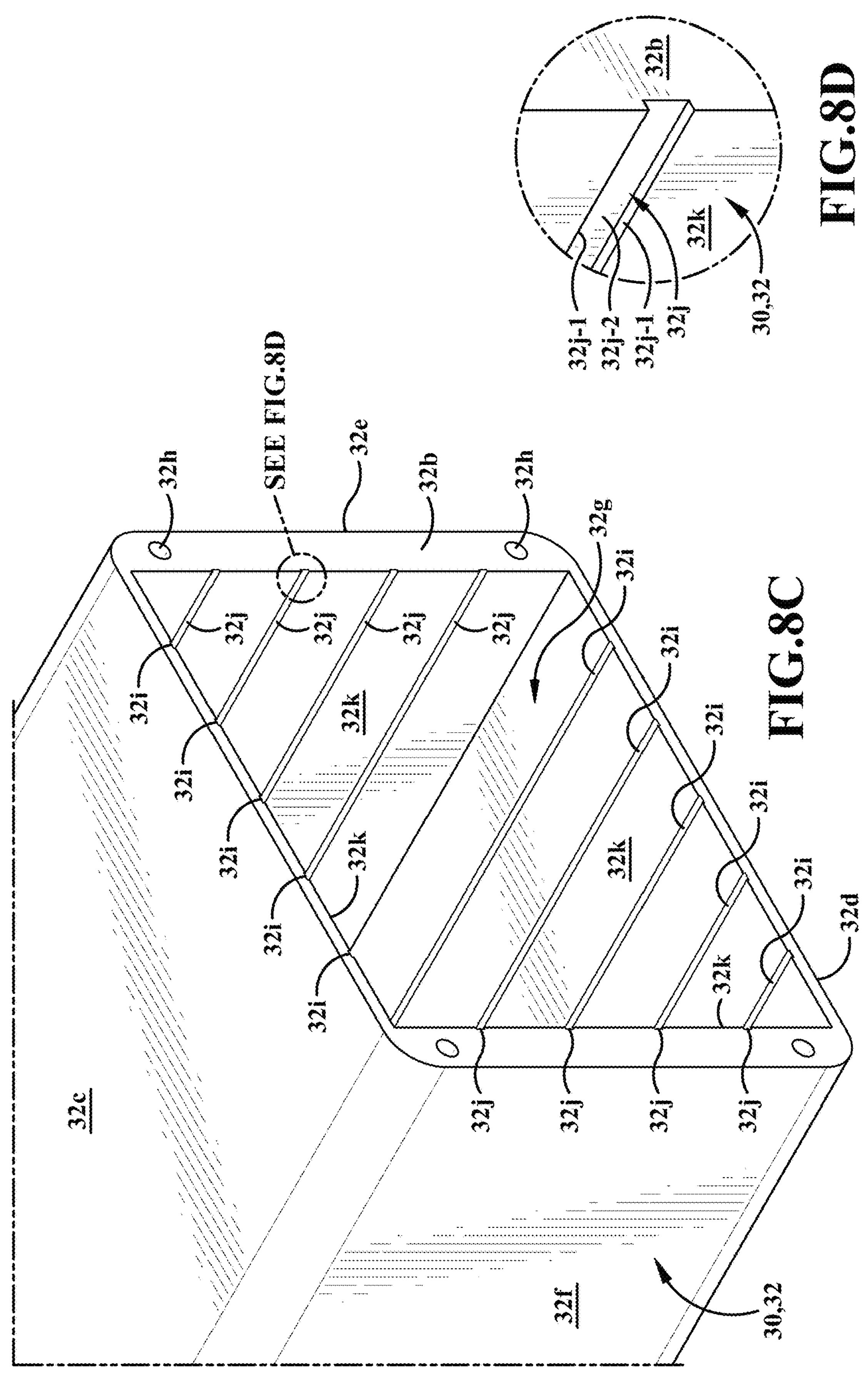
FIG. 8C is a top, rear, second side elevation view of the modular magazine shown in FIG. 2.
FIG. 8D is an enlarged view of the highlighted region shown in FIG. 8C.

With respect to second set of grooves 32*j*, each groove of the second set of grooves 32*j* is also defined by a pair of lateral walls 32*j*-1 that are spaced apart from and are parallel to one another and extend into the respective side wall 32*e*, 32*f* from the interior surface 32*k* to a base wall 32*j*-2 (see FIG. 8B). Additionally, each groove of the second set of grooves 32*j* is also defined by a stop or end wall 32*j*-3 that operably engages with the pair of lateral walls 32*j*-1 proximate to the front wall 32*a* of the main body 32. As discussed in greater detail below, the stop 32*j*-3 that defines a respective groove of the second set of grooves 32*j* is configured to prevent further linear movement of a partition of a set of partitions of CMDS 10 discussed herein so that such partition is free from exiting the main body 32 from the front end 32*a*. With such configuration, each partition of a set of partitions of CMDS 10 discussed herein may then be inserted into a desired groove of the set of second grooves 32*j* from the rear end 32 (see FIG. 8D). It should be understood that the pair of lateral walls 32*j*-1 and the base wall 32*j*-2 that form each groove of the second set of grooves 32*j* applies equally as to how each groove of the first set of grooves 32*i* is formed.

In the present disclosure, each groove of the set of first grooves 32*i* and the set of second grooves 32*j* has a truncated U-shaped configuration when the main body 32 is viewed from a front elevation view (see FIGS. 8-8A). In other exemplary embodiments, each groove of a set of first grooves and of a set of second grooves defined in a main body discussed herein may have suitable shape and/or geometric configuration for securing one or more partitions of a set of partitions with the main body. In other exemplary embodiments, a main body of a magazine discussed herein may include extensions or members that are mounted to or integral with an interior surface of the main body that operate substantially similar to the sets of grooves discussed herein.

CMDS 10 also includes a kit or set of partitions 40 that is removably engageable with the main body 32. Particularly, each set of partitions of the set of partitions 40 is removably engageable with the main body 32 at one or more grooves of the set of first grooves 32*i* and at one or more grooves of the set of second grooves 32*j*. As discussed in greater detail below, the set of partitions 40 configure the magazine 30 to be loaded with one or more sizes of countermeasure expendables 7 based on a given countermeasure operation. Such sets or groups that make up the set of partitions 40 are now discussed in greater detail below.

Figures 5, 5A, 5B:
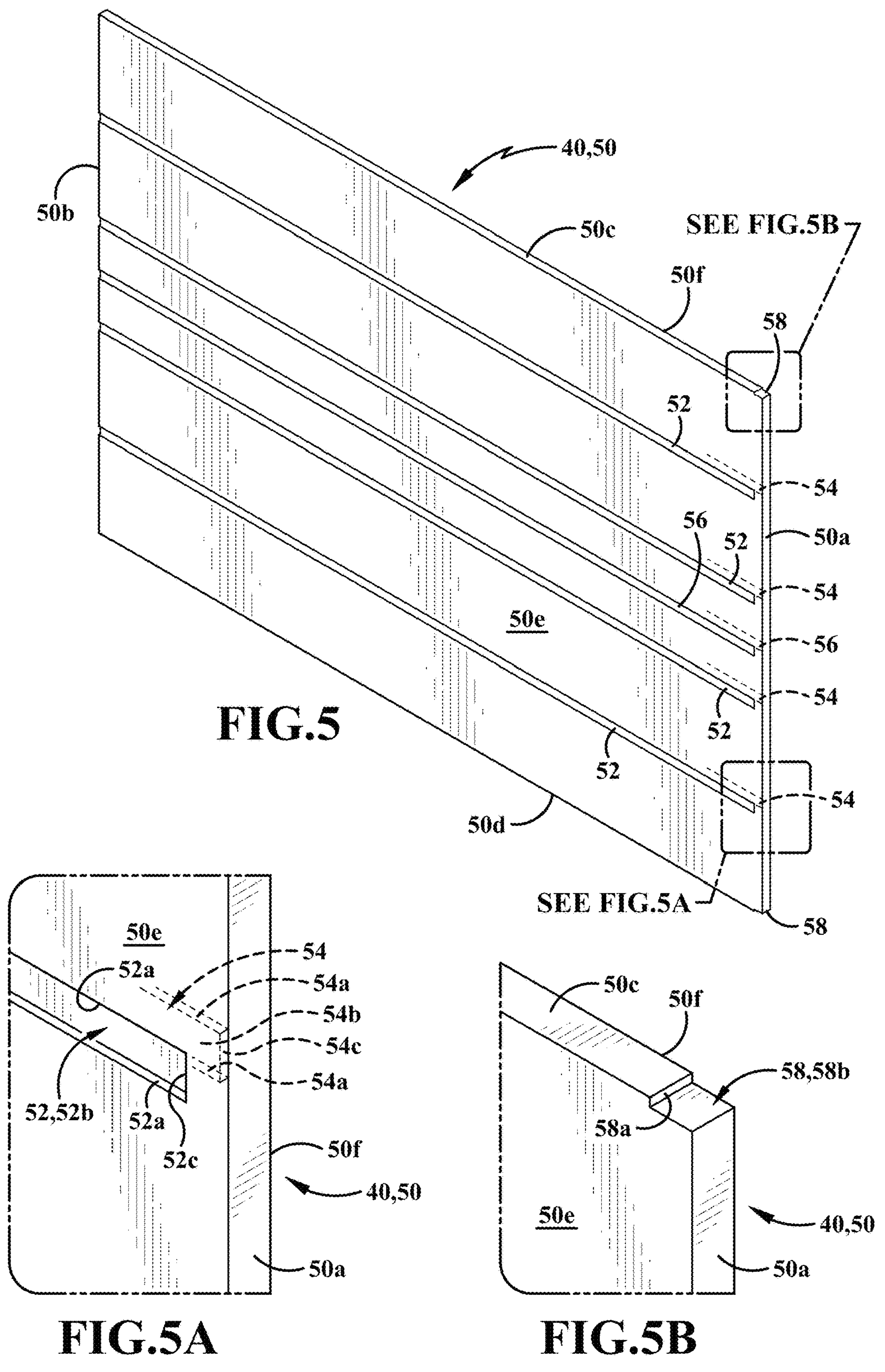
FIG. 5 is a front, top, first side isometric perspective view of a partition of a first group of partitions of the set of partitions.
FIG. 5A is an enlarged view of the highlighted region shown in FIG. 5.
FIG. 5B is an enlarged view of the highlighted region shown in FIG. 5.

The set of partitions 40 includes a first group of partitions 50 where each partition 50 is configured to be removably engageable with the top wall 32*c* and the bottom wall 32*d* of the main body 32. As best seen in FIG. 5, each partition of the first group of partitions 50 includes a first or front end 50*a*, a second or rear end 50*b* longitudinally opposite to the front end 50*a*, and a longitudinal axis defined therebetween. Each partition of the first group of partitions 50 also includes a top end 50*c*, a bottom end 50*d* that is vertically opposite to the top end 50*c*, and a vertical axis defined therebetween. Each partition of the first group of partitions 50 also includes a first side 50*e*, a second side 50*f* that is transversely opposite to the first side 50*e*, and a transverse axis defined therebetween.

Still referring to the first group of partitions 50, each partition of the first group of partitions 50 also defines a first set of channels 52 and a second set of channels 54. As best seen in FIG. 5A, each channel of the first set of channels 52 is defined by a pair of lateral walls 52*a* that are spaced apart from and parallel to one another and extend into the partition 50 from first side 50*e* to a base wall 52*b*. Each channel of the first set of channels 52 is also defined by a stop or end wall 52*c* that operably engages with the pair of lateral walls 52*a* proximate to the front wall 50*a* of the partition 60. The stop 52*c* is configured to prevent further linear movement of a partition of a second set of partitions 60 of CMDS 10 discussed herein so that such partition is free from exiting said partition 50 from the front end 50*a*. With such configuration, each partition of the second set of partitions 60 of CMDS 10 discussed herein may then be inserted into a desired channel of the first set of channels 52 from the rear end 50*b* since each channel of the first set of channels 52 is accessible at the rear end 50*b*.

Similarly, with respect to second set of channels 54, each channel of the second set of channels 54 is defined by a pair of lateral walls 54*a* that are spaced apart from and parallel to one another and extend into the partition 50 from second side 50*f* to a base wall 54*b*. Each channel of the second set of channels 54 is also defined by a stop or end wall 54*c* that operably engages with the pair of lateral walls 54*a* proximate to the front wall 50*a* of the partition 60. The stop 54*c* is configured to prevent further linear movement of a partition of a second set of partitions 60 of CMDS 10 discussed herein so that such partition is free from exiting said partition 50 from the front end 50*a*. With such configuration, each partition of the second set of partitions 60 of CMDS 10 discussed herein may then be inserted into a desired channel of the second set of channels 54 from the rear end 50*b* since each channel of the second set of channels 55 is also accessible at the rear end 50*b*.

As discussed in greater detail below, each partition of the first group of partitions 50 is configured to removably engage with one or more additional partitions of the set of partitions 40 at the first set of channels 52 and/or at the second set of channels 54 defined in a respective partition 50, such as the second group of partitions 60.

Still referring to the first group of partitions 50, each partition of the first group of partitions 50 also defines a pair of central channels 56. As best seen in FIG. 5, a first central channel of the pair of central channels 56 is defined in the first side 50*e*, and a second central channel of the pair of central channels 56 is defined in the second side 50*f*. In this embodiment, the first central channel of the pair of central channels 56 is positioned in between two pairs of channels of the first set of channels 52, and the second central channel of the pair of central channels 56 is positioned in between two pairs of channels of the second set of channels 54. Such use and purpose of the pair of central channels 56 is discussed in greater detail below.

Still referring to the first group of partitions 50, each partition of the first group of partitions 50 also defines a pair of notches 58. As best seen in FIG. 5B, a first or upper notch of the pair of notches 58 is defined by a lateral wall 58*a* that extends into the partition 50 from top end 50*c* to a base wall 58*b*. Similarly, a second or lower notch of the pair of notches 58 is also defined by a lateral wall 58*a* but extends into the partition 50 from bottom end 50*d* to a base wall 58*b*. As discussed in greater detail below, each partition of the first group of partitions 50 is configured to removably engage with main body 32 inside of a groove of the set of first grooves 32*i*. Upon such engagement, each notch of the pair of notches 58 receives a stop positioned inside of a groove of the set of grooves to prevent the partition of the first group of partitions from exiting through the main body 32 at the front end 32*a*. Particularly, the lateral wall 58*a* and the base wall 58*b* may directly abut the stop (such as stop 32*j*-3) such that the partition of the first group of partitions 50 is restricted from further linear movement inside of the groove 32*i* of the main body 32.

Figure 9A:
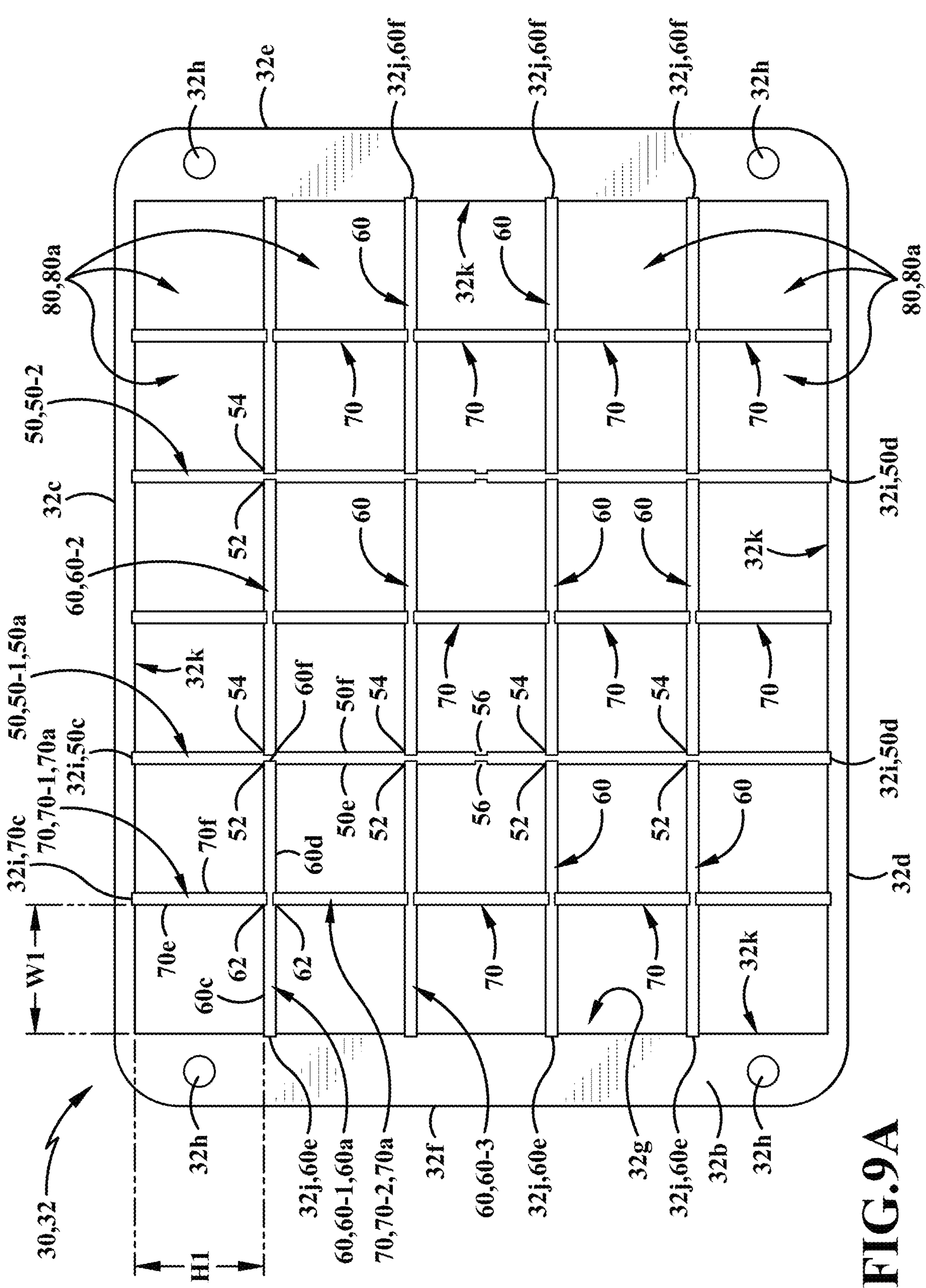
FIG. 9A is a rear elevation view of the modular magazine provided in a first configuration.

Upon assembly, one or more of the partitions of the first group of partitions 50 is configured to engage with the top wall 32*c* and the bottom wall 32*d* of the main body 32 inside of one or more grooves of the set of first grooves 32*i*. As best seen in FIGS. 3 and 9A, the top end 50*c* of each partition 50 is configured to engage with the top wall 32*c* of main body 32 inside of an upper groove of the set of first grooves 32*i*. Additionally, and as best seen in FIGS. 3 and 9A, the bottom end 50*d* of each partition 50 is configured to engage with the bottom wall 32*d* of main body 32 inside of a lower groove of the set of first grooves 32*i* that is aligned with the respective upper groove of the set of first grooves 32*i*.

Figures 6, 6A, 7:
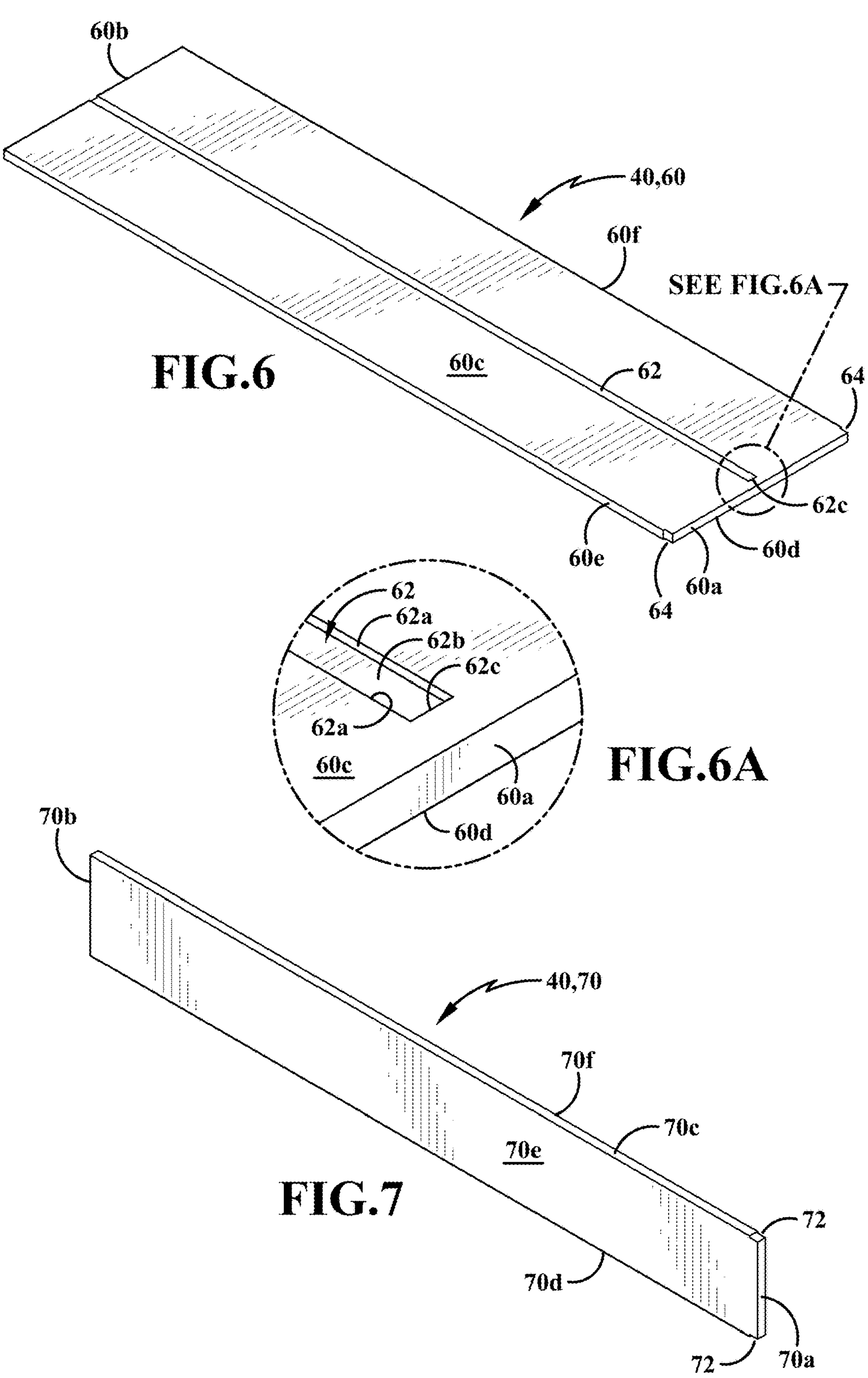
FIG. 6 is a front, bottom, first side isometric perspective view of a partition of a second group of partitions of the set of partitions.
FIG. 6A is an enlarged view of the highlighted region shown in FIG. 6.
FIG. 7 a front, top, first side isometric perspective view of a partition of a third group of partitions of the set of partitions.

The set of partitions 40 also includes a second group of partitions 60 where each partition 60 is configured to be removably engageable with the first side wall 32*e* or the second side wall 32*f* of the main body 32 inside of one or more grooves of the set of second grooves 32*j* and with a partition of the first group of partitions 50. As best seen in FIG. 6, each partition of the second group of partitions 60 includes a first or front end 60*a*, a second or rear end 60*b* longitudinally opposite to the front end 60*a*, and a longitudinal axis defined therebetween. Each partition of the second group of partitions 60 also includes a top end 60*c*, a bottom end 60*d* that is vertically opposite to the top end 60*c*, and a vertical axis defined therebetween. Each partition of the second group of partitions 60 also includes a first side 60*e*, a second side 60*f* that is transversely opposite to the first side 60*e*, and a transverse axis defined therebetween.

Still referring to the second group of partitions 60, each partition of the second group of partitions 60 also defines a pair of central slots 62. As best seen in FIG. 5, a first central slot of the pair of central channels 62 is defined in the first side 60*e*, and a second central slot 62 of the pair of central channels 62 is defined in the second side wall 62*f*. Each central slot 62 is defined by a pair of lateral walls 62*a* that are parallel to one another and spaced apart from one another and that extends into the partition 60 from the top end 60*c* or the bottom end 60*d* to a base wall 62*b*. Each central slot 62 is also defined by a stop or end wall 62*c* that operably engages with the pair of lateral walls 62*a* proximate to the front wall 60*a* of the partition 60. The stop 62*c* is configured to prevent further linear movement of a partition of a set of partitions of CMDS 10 discussed herein so that such partition is free from exiting said partition 60 from the front end 60*a*. With such configuration, each partition of a set of partitions of CMDS 10 discussed herein may then be inserted into a desired central slot of the pair of central slots 62 from the rear end 60*b* since each central slot of the pair of central slots 62 is accessible at the rear end 60*b*.

Still referring to the second group of partitions 60, each partition of the second group of partitions 60 also defines a pair of notches 64. As best seen in FIG. 6A, a first notch of the pair of notches 64 is defined by a lateral wall that extends into the partition 60 from first side 60*e* to a base wall. Similarly, a second notch of the pair of notches 64 is also defined by a lateral wall but extends into the partition 50 from second side 60*f* to a base wall. As discussed in greater detail below, each partition of the second group of partitions 60 is configured to removably engage with main body 32 inside of a groove of the set of second grooves 32*j* and with a partition of the first group of partitions 50 inside of the first set of channels 52 and/or second set of channels 54.

Upon such engagement, a first notch of the pair of notches 64 receives a stop positioned inside of a groove of the set of second grooves 32*j* of main body 32 to prevent the partition of the second group of partitions 60 from exiting through the main body 32 at the front end 32*a*. Particularly, the lateral wall and the base wall that defines the respective notch 64 may directly abut the stop (such as stop 32*j*-3) such that the partition of the second group of partitions 60 is restricted from further linear movement inside of the groove 32*j* of the main body 32. Similarly, a second notch of the pair of notches 64 receives a stop 52*c*, 64*c* positioned inside of a channel of the inside of the first set of channels 52 or second set of channels 54 to prevent the partition of the second group of partitions 60 from exiting through the partition 50 at the front end 50*a*. Particularly, the lateral wall and the base wall that defines the respective notch 64 may directly abut the stops 52*c*, 54*c* such that the partition of the second group of partitions 60 is restricted from further linear movement inside of a channel of the first set of channels 52 or second set of channels 54.

The set of partitions 40 also includes a third group of partitions 70 where each partition 70 is configured to be removably engageable with the top wall 32*c* and the bottom wall 32*d* of the main body 32 inside of one or more grooves of the set of first grooves 32*i* and with a partition of the second group of partitions 60. As best seen in FIG. 7, each partition of the third group of partitions 70 includes a first or front end 70*a*, a second or rear end 70*b* longitudinally opposite to the front end 70*a*, and a longitudinal axis defined therebetween. Each partition of the third group of partitions 70 also includes a top end 70*c*, a bottom end 70*d* that is vertically opposite to the top end 70*c*, and a vertical axis defined therebetween. Each partition of the third group of partitions 70 also includes a first side 70*e*, a second side 70*f* that is transversely opposite to the first side 70*e*, and a transverse axis defined therebetween.

Still referring to the third group of partitions 70, each partition of the third group of partitions 70 also defines a pair of notches 72. As best seen in FIG. 7, a first or upper notch of the pair of notches 72 is defined by a lateral wall that extends into the partition 70 from top end 70*c* to a base wall. Similarly, a second or lower notch of the pair of notches 72 is also defined by a lateral wall but extends into the partition 70 from bottom end 70*d* to a base wall. As discussed in greater detail below, each partition of the third group of partitions 70 is configured to removably engage with main body 32 inside of a groove of the set of first grooves 32*i* and with a partition of the second group of partitions 60 inside a slot of the pair of slots 62.

Upon such engagement, a first notch of the pair of notches 72 receives a stop positioned inside of a groove of the set of first grooves 32*i* of main body 32 to prevent the partition of the third group of partitions 70 from exiting through the main body 32 at the front end 32*a*. Particularly, the lateral wall and the base wall that defines the respective notch 72 may directly abut the stop of the second groove 32*i* such that the partition of the third group of partitions 70 is restricted from further linear movement inside of the groove 32*i* of the main body 32. Similarly, a second notch of the pair of notches 72 receives stop 62*c* positioned inside of a slot of the pair of slots 62 to prevent the partition of the third group of partitions 70 from exiting through the partition 60 at the front end 60*a*. Particularly, the lateral wall and the base wall that defines the respective notch 72 may directly abut the stop 62*c* such that the partition of the third group of partitions 70 is restricted from further linear movement inside of a slot of the pair of slots 62.

As discussed previously, magazine 30 is modular based on the functionality one or more partitions of the first, second, and third group of partitions 50, 60, 70 being engaged with the main body 32. Upon assembly of the main body 32 and the set of partitions 40, the main body 32 and the set of partitions 40 collectively define a set of compartments or passageways 80 for main body and/or storing one or more sets of expendables 7 having identical dimensions or differing dimensions. The following magazine embodiments provide at least three configurations in which the main body 32 and the set of partitions 40 may define one or more groups or types of compartments for the set of compartments 80 for main body and/or storing various types of expendables 7.

FIG. 9A illustrates an a first magazine configuration where main body 32 and the set of partitions 40 may define a first group of compartments 80*a* of the set of compartments 80. In the present disclosure, each compartment of the first group of compartments 80*a* has a first width W1 and a first height H1. In one example, the first width W1 and the first height H1 are equal to one another. Particularly in this example, each compartment of the first group of compartments 80*a* has a one-inch height by one-inch width dimension in this first configuration. As best seen in FIG. 9A, each partition of the first group of partitions 50 operably engages with the top wall 32*c* and the bottom wall 32*d* of the main body 32 inside of grooves of the set of first grooves 32*i*. Particularly, the top end 50*c* of a partition of the first group of partitions 50 operably engages with the top wall 32*c* of main body 32 inside of an upper groove of the set of first grooves 32*i*, and the bottom end 50*d* of the same partition of the first group of partitions 50 operably engages with the bottom wall 32*d* of main body 32 inside of a lower groove of the set of first grooves 32*i* that is aligned with the respective upper groove of the set of first grooves 32*i*.

Still referring to FIG. 9A, a number of partitions of the second group of partitions 60 operably engage with the first side wall 32*e* or the second side wall 32*f* of the main body 32 inside of grooves of the set of second grooves 32*j* and with an adjacent partition of the first group of partitions 50 inside of the first set of channels 52 or second set of channels 54. In one example, a first partition 60-1 of the second group of partitions 60 removably engages with a groove of the set of second grooves 32*j* at the first side wall 32*e* and with a channel of first set of channels 52 defined in a first partition 50-1 of the first group of partitions 50. Additionally, another number of partitions of the second group of partitions 60 also operably engage with two adjacent partitions of the first group of partitions 50 inside of the first set of channels 52 or second set of channels 54. In one example, a second partition 60-2 of the second group of partitions 60 removably engages with a channel of the second set of channels 54 of the first partition 50-1 of the first group of partitions 50 and with a channel of the first set of channels 52 of a second partition 50-2 of the first group of partitions 50.

Still referring to FIG. 9A, a number of partitions of the third group of partitions 70 operably engage with the top wall 32*c* or the bottom wall 32*d* of the main body 32 inside of grooves of the set of first grooves 32*i* and with an adjacent partition of the second group of partitions 60 inside of a slot of the pair of slots 62. In one example, a first partition 70-1 of the third group of partitions 70 removably engages with a groove of the set of first grooves 32*i* at the top wall 32*c* and with an upper slot of the pair of slots 62 defined in the first partition 60-1 of the second group of partitions 60. Additionally, another number of partitions of the third group of partitions 70 also operably engage with two adjacent partitions of the second group of partitions 60 inside of the pairs of slots 62. In one example, a second partition 70-2 of the third group of partitions 70 removably engages with a lower slot of the pairs of slots 62 of the first partition 60-1 of the second group of partitions 60 and with an upper slot of the pairs of slots 62 of a third partition 60-3 of the second group of partitions 60.

Figure 9B:
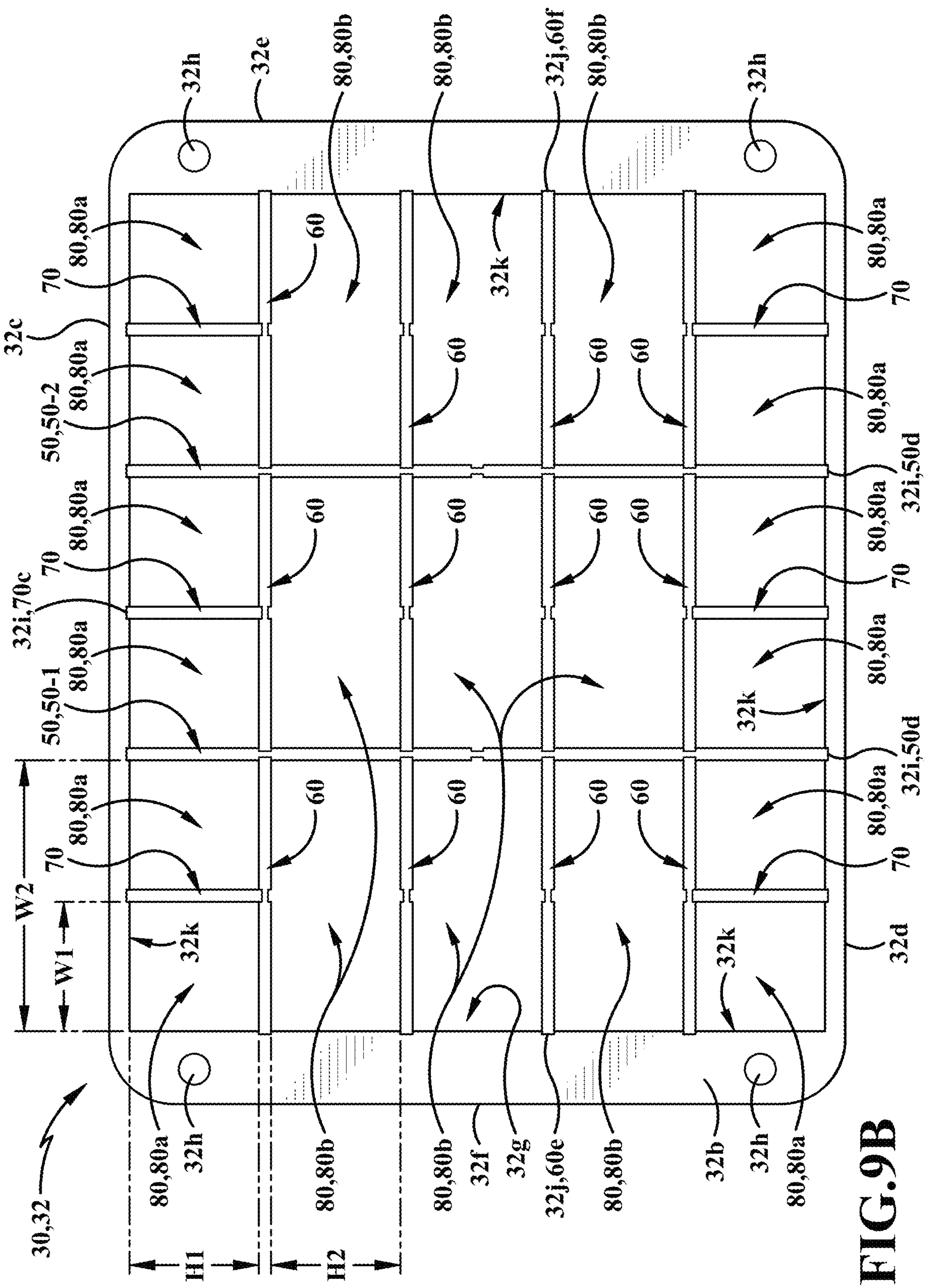
FIG. 9B is a rear elevation view of the modular magazine provided in a second configuration.

FIG. 9B illustrates another or second magazine configuration where the main body 32 and the set of partitions 40 may define the first group of compartments 80*a* of the set of compartments 80 and a second group of compartments 80*b* of the set of compartments 80 as compared to the first configuration (see FIG. 9A) only defining the first group of compartments 80*a*. In this configuration, each compartment of the second group of compartments 80*b* has a second width W2 and a second height H2. In one example, the second width W2 is greater than the second height H2. Particularly, in this configuration, each compartment of the second group of compartments 80*b* has a one-inch height by two-inch dimension width dimension as compared to each compartment of the first group of compartments 80*a* having a one-inch height by one-inch width dimension.

As best seen in FIG. 9B, each partition of the first group of partitions 50 operably engages with the top wall 32*c* and the bottom wall 32*d* of the main body 32 inside of grooves of the set of first grooves 32*i*. It should be noted that the engagement between the main body 32 and the first group of partitions 50 in this second configuration is substantially similar to the engagement between the main body 32 and the first group of partitions 50 in the first configuration (see FIG. 9A).

Referring to FIG. 9B, a number of partitions of the second group of partitions 60 operably engage with the first side wall 32*e* or the second side wall 32*f* of the main body 32 inside of grooves of the set of second grooves 32*j* and with an adjacent partition of the first group of partitions 50 inside of the first set of channels 52 or second set of channels 54 similar to the configuration shown in FIG. 9A. In one example, the first partition 60-1 of the second group of partitions 60 is removably engaged with a groove of the set of second grooves 32*j* at the first side wall 32*e* and with a channel of first set of channels 52 defined in a first partition 50-1 of the first group of partitions 50. Additionally, another number of partitions of the second group of partitions 60 also operably engage with two adjacent partitions of the first group of partitions 50 inside of the first set of channels 52 or second set of channels 54. In one example, the second partition 60-2 of the second group of partitions 60 removably engages with a channel of the second set of channels 54 of the first partition 50-1 of the first group of partitions 50 and with a channel of the first set of channels 52 of a second partition 50-2 of the first group of partitions 50.

Still referring to FIG. 9B, a number of partitions of the third group of partitions 70 operably engage with the top wall 32*c* or the bottom wall 32*d* of the main body 32 inside of grooves of the set of first grooves 32*i* and with an adjacent partition of the second group of partitions 60 inside of a slot of the pair of slots 62. In one example, a first partition 70-1 of the third group of partitions 70 removably engages with a groove of the set of first grooves 32*i* at the top wall 32*c* inside of the chamber 32*g* and with a slot of the pairs of slots 62 defined in the first partition 60-1 of the second group of partitions 60. However, in this configuration, the number of partitions of the third group of partitions 70 is reduced so that the magazine 30 includes the first group of compartments 80*a* and the second group of compartments 80*b*. As such, at least one or more partitions of the third group of partitions 70 must be removed or omitted in order for the main body 32 and set of partitions 40 to include the first group of compartments 80*a* and the second group of compartments 80*b*.

Figure 9C:
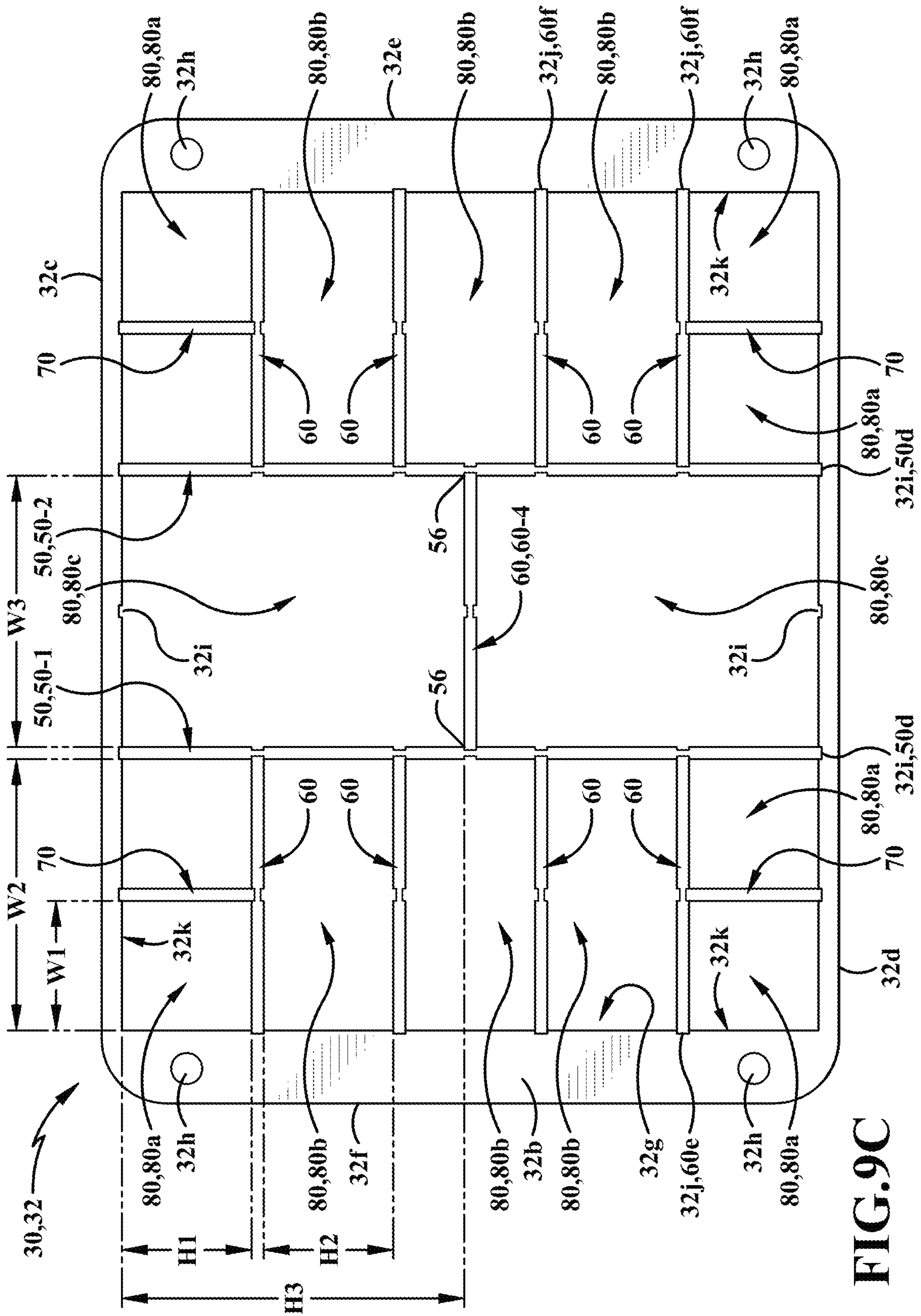
FIG. 9C is a rear elevation view of the modular magazine provided in a third configuration.

FIG. 9C illustrates another or third configuration where the main body 32 and the set of partitions 40 may define the first group of compartments 80*a* and second group of compartments 80*b* of the of the set of compartments 80 as well as a third group of compartment 80*c* of the set of compartments 80 in this third configuration as compared to the first configuration (see FIG. 9A) only defining the first group of compartments 80*a* and the second configuration (see FIG. 9B) only defining the first and second groups of compartments 80*a*, 80*b*. In this configuration, each compartment of the third group of compartments 80*c* has a third width W3 and a third height H3. In one example, the third width W3 is less than the third height H3. Particularly, in this configuration, each compartment of the third group of compartments 80*c* has a two-inch height by two-and-one-half-inch width dimension as compared to each compartment of the second group of compartments 80*b* having a one-inch height by two-inch width dimension and each compartment of the first group of compartments 80*a* having a one-inch height by one-inch width dimension.

As best seen in FIG. 9C, each partition of the first group of partitions 50 operably engages with the top wall 32*c* and the bottom wall 32*d* of the main body 32 inside of grooves of the set of first grooves 32*i*. It should be noted that the engagement between the main body 32 and the first group of partitions 50 in this third configuration is substantially similar to the engagement between the main body 32 and the first group of partitions 50 in the first and second configurations (see FIGS. 9A-9B).

Referring to FIG. 9C, a number of partitions of the second group of partitions 60 operably engage with the first side wall 32*e* or the second side wall 32*f* of the main body 32 inside of grooves of the set of second grooves 32*j* and with an adjacent partition of the first group of partitions 50 inside of the first set of channels 52 or second set of channels 54 similar to the first configuration shown in FIG. 9A and the second configuration shown in FIG. 9B. However, in this third configuration, the number of partitions of the second group of partitions 60 is reduced so that the magazine 30 includes the first group of compartments 80*a*, the second group of compartments 80*b*, and the third group of compartments 80*c*. As such, at least one or more partitions of the second group of partitions 60 must be removed or omitted in order for the main body 32 and set of partitions 40 to include the first group of compartments 80*a*, the second group of compartments 80*b*, and the third group of compartments 80*c*.

In this second configuration, it should be noted that a central or fourth partition 60-4 of the second group of partitions 60 is engaged with the first group of partitions 50. Particularly, and as best seen FIG. 9C, the central partition 60-4 engages with the first group of partitions 50 inside of the pair of central channels 56. With such engagement, the main body 32, the first group of partitions 50, and the central partition 60-4 of the second group of partitions 60 collectively define the third group of compartments 80*c*.

Still referring to FIG. 9C, a number of partitions of the third group of partitions 70 operably engage with the top wall 32*c* or the bottom wall 32*d* of the main body 32 inside of grooves of the set of first grooves 32*i* and with an adjacent partition of the second group of partitions 60 inside of a slot of the pair of slots 62. However, in this configuration, the number of partitions of the third group of partitions 70 is reduced so that the magazine 30 includes the first group of compartments 80*a*, the second group of compartments 80*b*, and the third group of compartments 80*c*. As such, at least one or more partitions of the third group of partitions 70 must be removed or omitted in order for the main body 32 and set of partitions 40 to include the first group of compartments 80*a*, the second group of compartments 80*b*, and the third group of compartments 80*c*.

It should be understood that breechplate assembly 24 is configured to accommodate and dispense any suitable number countermeasure expendables 7 that may be loaded in the magazine 30 based one or more configurations of magazine 30 mentioned or suggested herein. It should also be noted that operators or technicians of CMDS 10 may also change the breechplate assembly 24 to match or correspond to the configuration of the set of compartments 80 defined collectively by main body 32 and set of partitions 40.

Figure 9D:
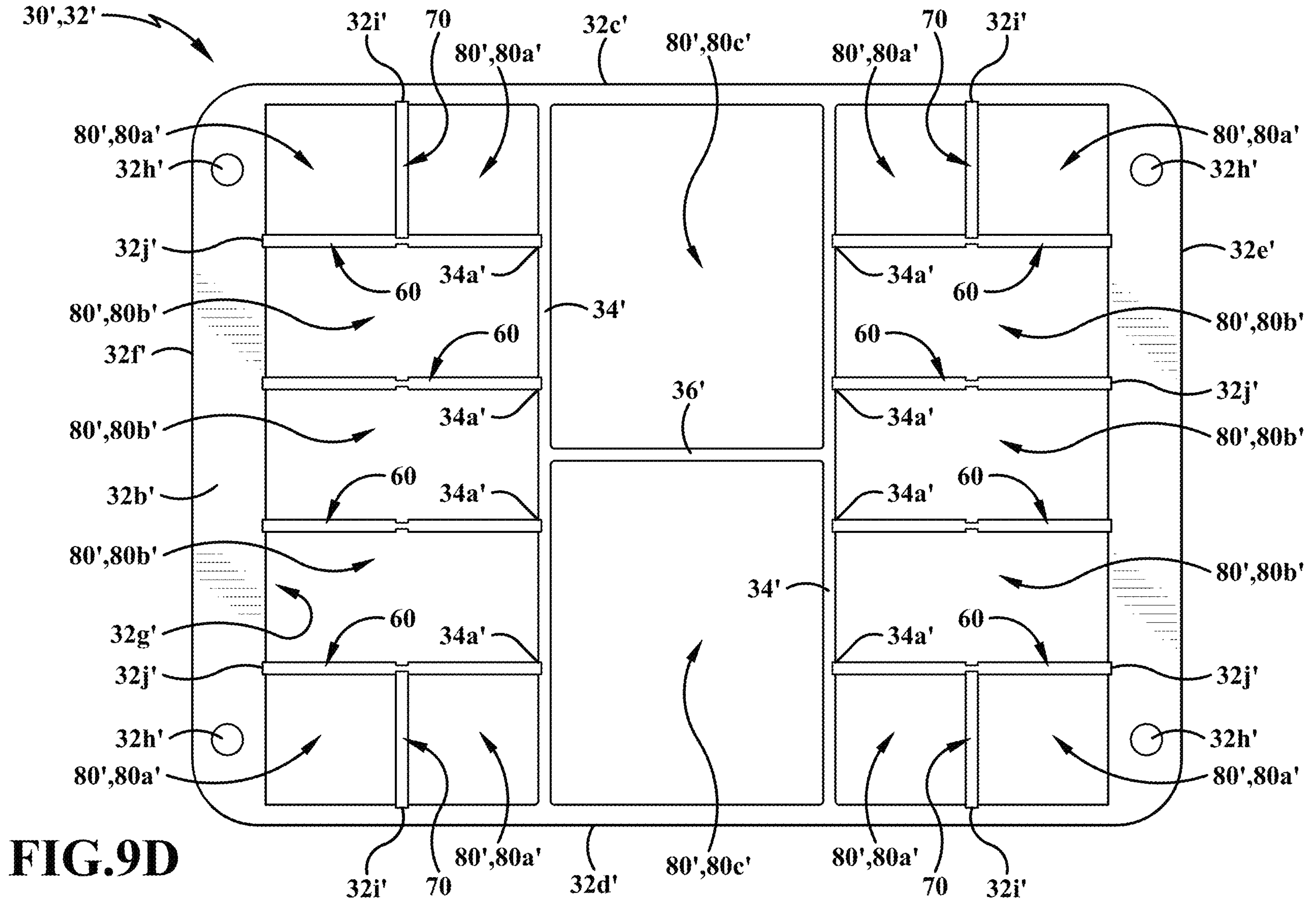
FIG. 9D is a rear elevation view of a modular magazine in accordance with another aspect of the present disclosure, wherein the modular magazine is partially modular.

FIG. 9D illustrates an alternative main body 32' of magazine 30' that is similar to main body 32 of magazine 30 discussed above and shown in FIGS. 3-4, 8-9C, and 10A-11C. In this alternative embodiment, main body 32' includes a front wall 32*a*', a rear wall (not shown), a pair of horizontal walls 32*c*', 32*d*', a pair of vertical walls 32*e*', 32*f*', a chamber 32*g*', a set of attachment openings 32*h*', a set of first grooves 32*i*', and a set of second grooves 32*j*' are similar to front wall 32*a*, rear wall 32*b*, pair of horizontal walls 32*c*, 32*d*, pair of vertical walls 32*e*, 32*f*, chamber 32*g*, set of attachment openings 32*h*, set of first grooves 32*i*, and set of second grooves 32*j* of the main body 32.

However, in this alternative embodiment, main body 32' includes a pair of upright walls 34' where each upright wall 34' is integral with the main body 32' and is positioned inside of the chamber 32*g*'. As best seen in FIG. 9D, the pair of upright walls 34' fixedly engages with the pair of horizontal walls 32*c*', 32*d*' inside of the chamber 32*g*' where each wall 34' is spaced apart from and are parallel to one another. Each upright wall of the pair of upright walls 34' also defines a set of channels 34*a*' for receiving and engaging with one or more partitions of a set of partitions mentioned herein. The set of channels 34*a*' defined in each upright wall of the pair of upright walls 34' faces towards a respective vertical wall of the pair of vertical walls 32*e*', 32*f*' of main body 32'. In this embodiment, partitions of the second group of partitions 60 removably engage with the pair of upright walls 34' inside of the set of channels 34*a*'. It should be noted that such engagement between the pair of upright walls 34' and the second group of partitions 60 (or other partitions mentioned herein) is substantially similar to the engagement between the first group of partitions 50 and the second group of partitions 60.

Still referring to this alternative embodiment, main body 32' also includes a lateral wall 36' that is integral with the pair of upright walls 34'. As best seen in FIG. 9D, the lateral wall 36' extends between the pair of upright walls 34' along an axis that is non-parallel to the pair of upright walls 34'. Particularly, the lateral wall 36' extends between the pair of upright walls 34' along an axis that is orthogonal to the pair of upright walls 34'. Such inclusion of the lateral wall 36' with the pair of upright walls 34' assists the main body 32' to define a third group of compartments 80*c*' (substantially similar to third group of compartments 80*c*) while the partitions engaged with main body 32' define first and second groups of compartments 80*a*', 80*b*' that are substantially similar to first and second groups of compartments 80*a*, 80*b*.

Such use of alternative main body 32' may be desired by operators or technicians when specific countermeasure expendables (such as countermeasure expendables 7*c*) are intended to be loaded into main body 32' and used by platform 1 during a countermeasure operation. This alternative main body 32' may also reduce steps of configuring the main body 32' with a desired number of partitions when specific countermeasure expendables (such as countermeasure expendables 7*c*) are intended to be loaded into main body 32' and used by platform 1 during a countermeasure operation.

In the present disclosure, all main bodies of magazines discussed herein, including main bodies 32, 32', may be formed from any suitable material. In one example, a main body of a magazine mentioned herein may be formed of fiberglass or similar type of fiber-reinforced plastic material. It should be noted that such use of fiberglass and/or fiber-reinforced plastic material is desired by the inventors to reduce the overall weight of the main body while still maintaining rigidity for housing and supporting a plurality of countermeasure expendables. It should also be noted that any sets of partitions mentioned herein, including first, second, and third sets of partitions 50, 60, 70, may also be formed from the same fiberglass and/or fiber-reinforced plastic material to reduce the overall weight of CMDS while still maintaining rigidity for housing and supporting a plurality of countermeasure expendables. In another example, a main body of a magazine mentioned herein may be formed of carbon fiber. In another example, a main body of a magazine mentioned herein may be formed of metal or similar metallic material, such as aluminum.

Having now discussed the components and parts of CMDS 10, particularly main body 32 and the set of partitions 40, methods of configuring a magazine with the set of partitions 40 are now discussed in greater detail below.

Prior to loading the magazine 30 with the set of countermeasure expendables 7, an operator or technician handling the magazine 30 must install a predetermined number of partitions from the set of partitions 40 with the main body 32 to define a predetermined number of compartments 80.

Figure 10A:
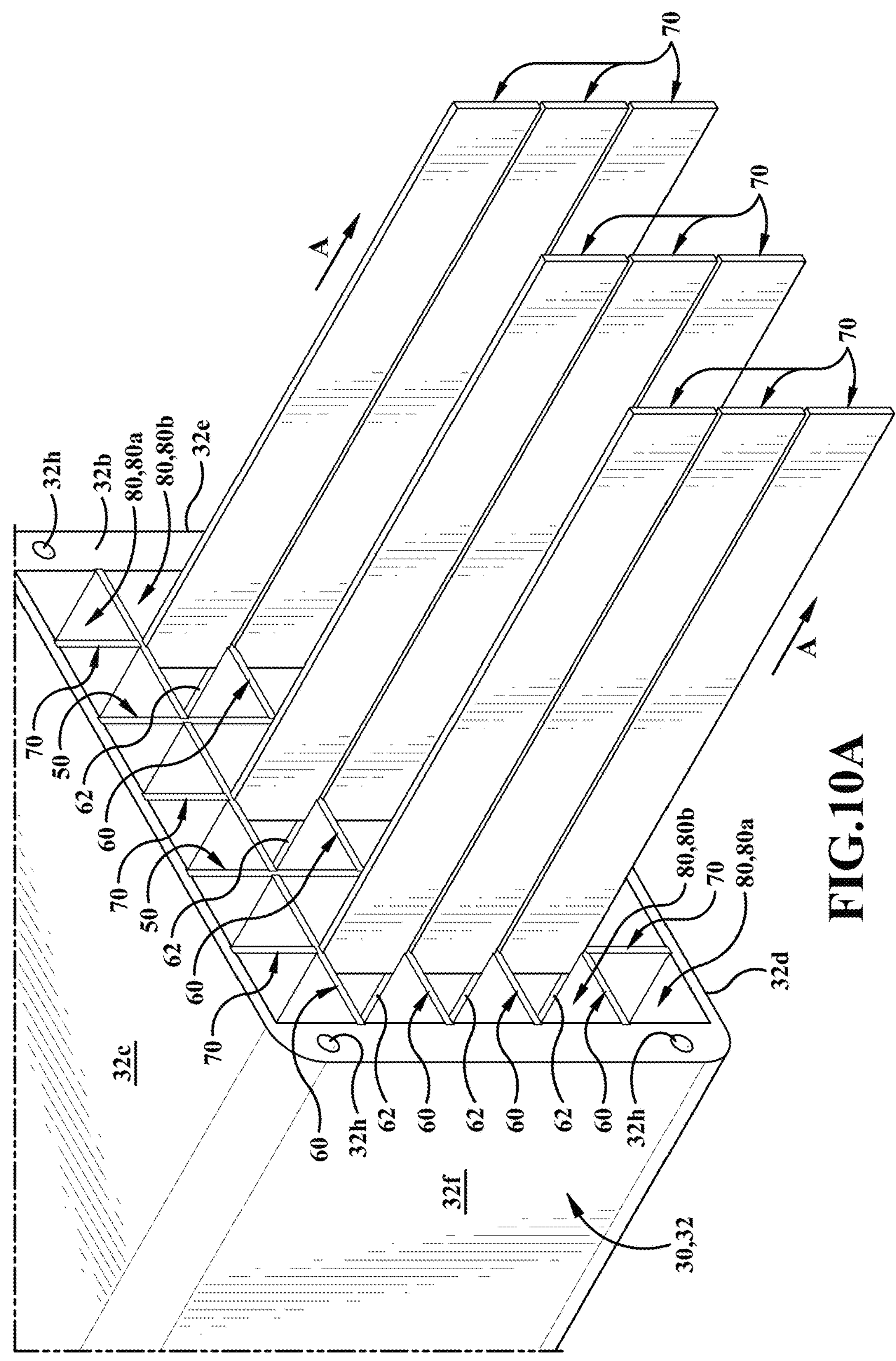
FIG. 10A is an operational view of partitions of the first group of partitions being removed from the main body of the magazine.
Figure 10B:
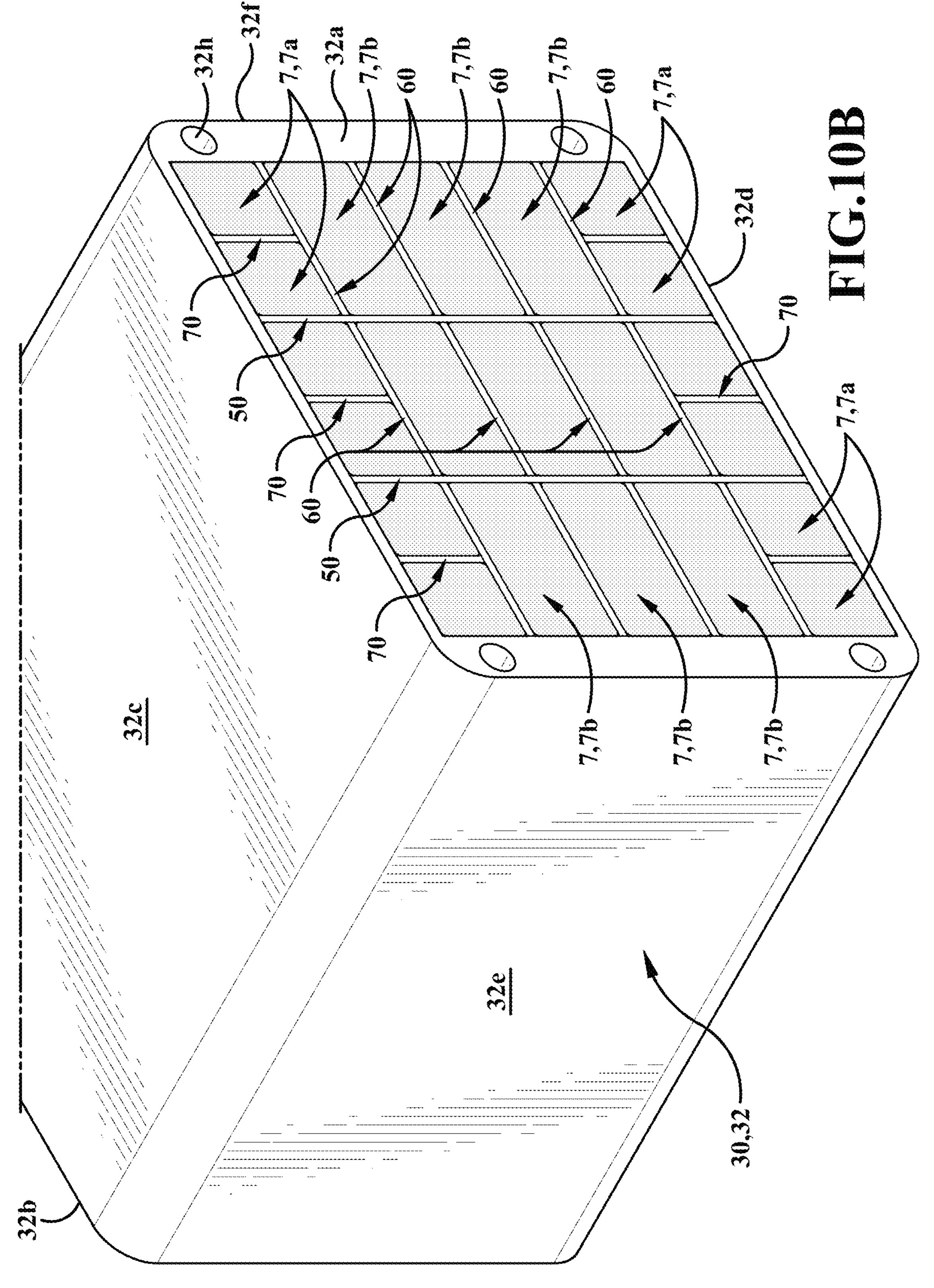
FIG. 10B is another operational view continuing from FIG. 10A, wherein the modular magazine is provided in the second configuration subsequent to removing partitions of the first group of partitions and is loaded with first and second groups of countermeasure expendables of a set of countermeasure expendables.

In one example, and as best seen in FIGS. 10A-10B, the operator configures the main body 32 and the set of partitions 40 from the first configuration (see FIG. 9A) to the second configuration (see FIG. 9B). Particularly, operator configures the main body 32 and the set of partitions 40 so that the main body 32 and the set of partitions 40 collectively define first and second groups of compartments 80*a*, 80*b* instead of the first group of compartments 80*a* only. In this example, the operator pulls a predetermined number of partitions of the third group of partitions 70 from the main body 32 in order for the main body 32 and the set of partitions 40 to collectively define first and second groups of compartments 80*a*, 80*b* instead of the first group of compartments 80*a* only. Such removal of the predetermined number of partitions of the third group of partitions 70 from the main body 32 is denoted by an arrow labeled "A" in FIG. 10A.

Once the predetermined number of partitions of the third group of partitions 70 are removed from the main body 32, the operator may then load the magazine 30 with a suitable number of countermeasure expendables. As best seen in FIG. 10B, the operator may load a first group of countermeasure expendables 7*a* into the first group of compartments 80*a* where the dimensions of each countermeasure expendable of the first group of countermeasure expendables 7*a* matches with the dimensions of each compartment of the first group of compartments 80*a*. Similarly, and as best seen in FIG. 10B, the operator may also load a second group of countermeasure expendables 7*b* into the second group of compartments 80*b* where the dimensions of each countermeasure expendable of the second group of countermeasure expendables 7*b* matches with the dimensions of each compartment of the second group of compartments 80*b*. Once the expendables 7*a*, 7*b* are loaded, a retaining plate or retainer may be engaged with the main body 32 to secure the expendables 7*a*, 7*b* and the set of partitions 40 inside of the main body 32. Such use of the retaining plate prevents the expendables 7*a*, 7*b* and the set of partitions 40 from exiting the main body 32 as the expendables 7*a*, 7*b*, the magazine 30, and the set of partitions 40 are loaded into the platform 1.

At this stage, the operator may then load the set of countermeasure expendables 7*a*, 7*b*, the magazine 30, and the set of partitions 40, collectively, into the main body 22 of the dispenser assembly 20 that is installed with the main body 2 of platform 1. Once the set of countermeasure expendables 7*a*, 7*b*, the main body 32 of magazine 30, and the set of partitions 40 are loaded inside of the main body 22, the connector 34 may then be installed with the main body 32 to releasably engage the magazine 30 (along with the set of countermeasure expendables 7*a*, 7*b* and the set of partitions 40) with the main body 22.

Figure 11A:
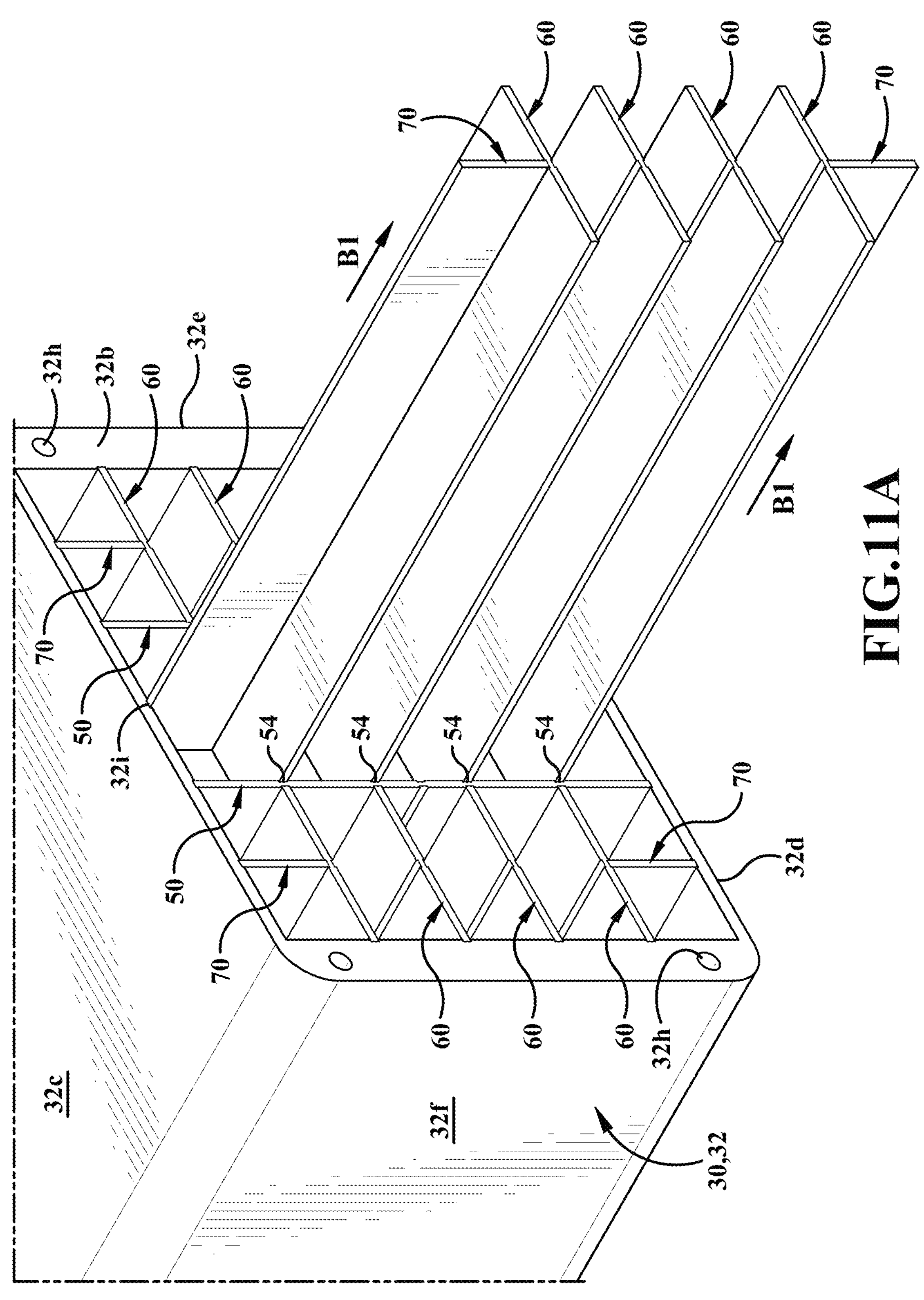
FIG. 11A is an operational view of partitions of the second group of partitions and partitions of the third group of partitions being removed from the main body of the magazine.
Figure 11B:
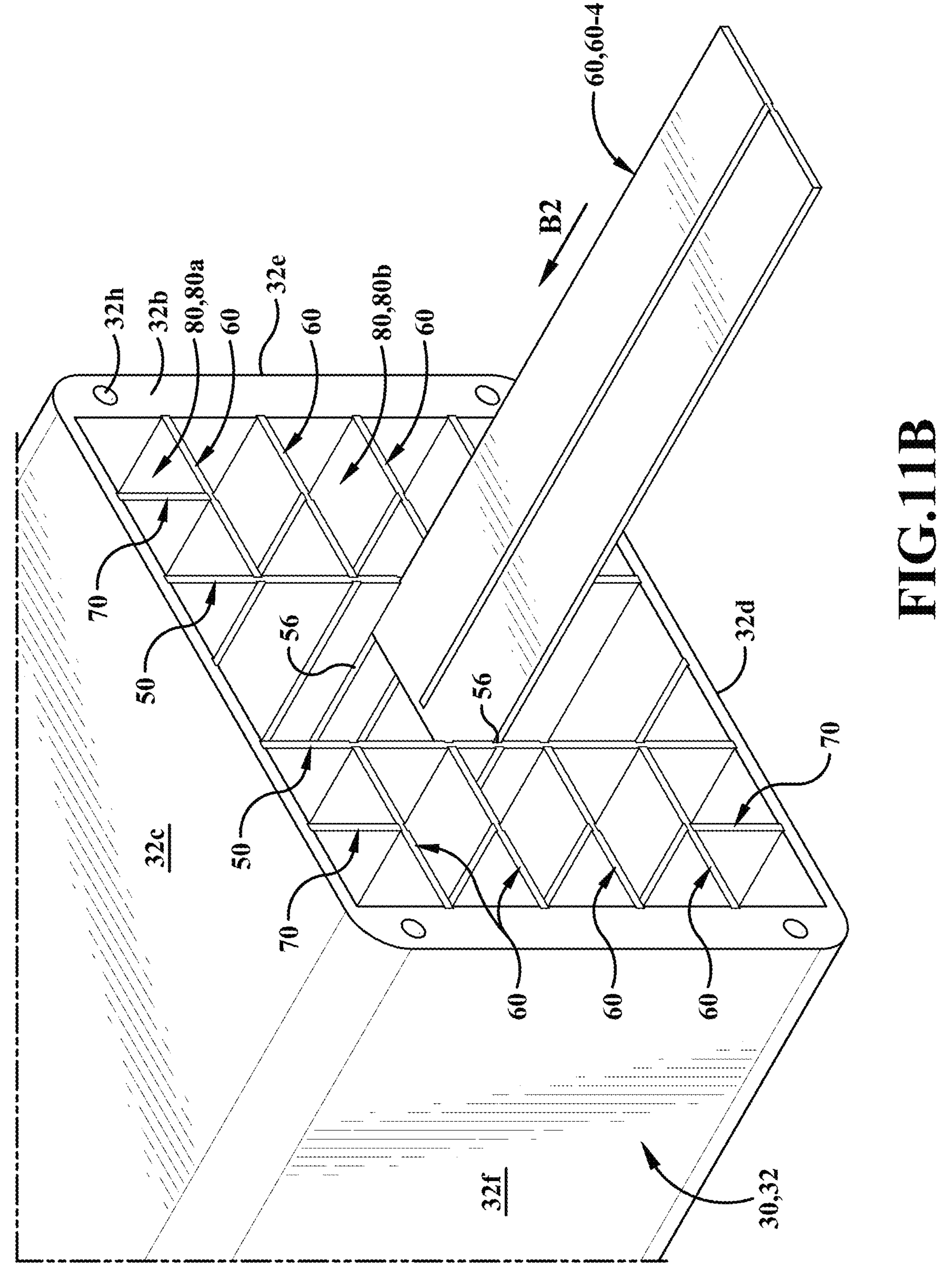
FIG. 11B is another operational view continuing from FIG. 11A, wherein a partition of the second group of partitions is being inserted into two adjacent partitions of the first group of partitions.
Figure 11C:
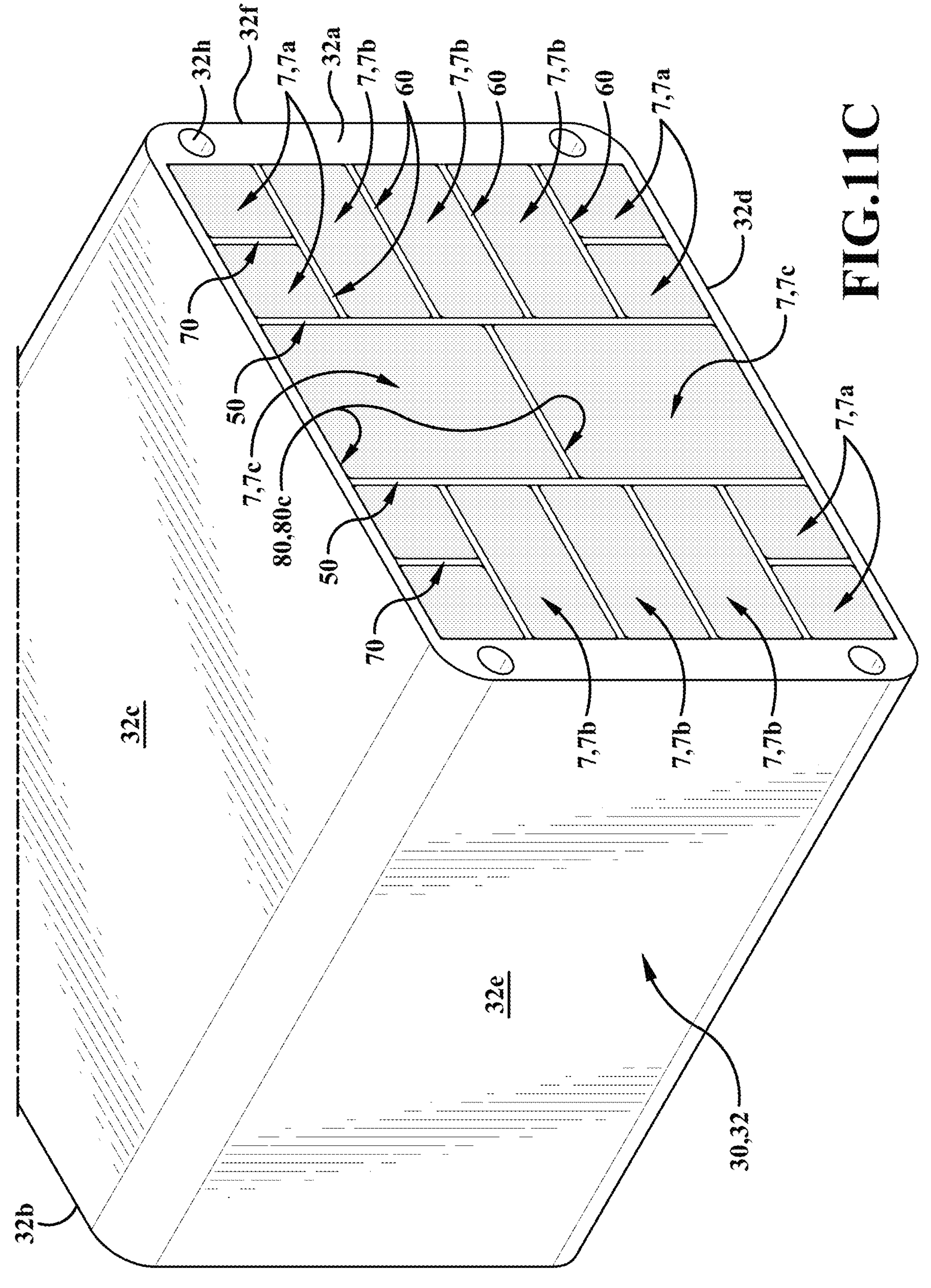
FIG. 11C is another operational view continuing from FIG. 11B, wherein the modular magazine is provided in the third configuration and is loaded with first, second, and third groups of countermeasure expendables of the set of countermeasure expendables.

In another example, and as best seen in FIGS. 11A-11C, operator configures the main body 32 and the set of partitions 40 from a second configuration (see FIG. 9B) to the third configuration (see FIG. 9C). Particularly, operator configures the main body 32 and the set of partitions 40 so that the main body 32 and the set of partitions 40 collectively define first, second, and third groups of compartments 80$a$, 80$b$, 80$c$ instead of the first and second groups of compartments 80$a$, 80$b$ only. In this example, the operator pulls a predetermined number of partitions of the second group of partitions 60 from the main body 32 and a predetermined number of partitions of the third group of partitions 70 from the main body 32 in order for the main body 32 and the set of partitions 40 to collectively define first, second, and third groups of compartments 80$a$, 80$b$, 80$c$. Such removal of the predetermined number of partitions of the second group of partitions 60 from the main body 32 and the predetermined number of partitions of the third group of partitions 70 from the main body 32 is denoted by an arrow labeled "B1" in FIG. 11A.

In this third configuration, operator operably engages a partition of the second group of partitions 60 into the partitions of the first group of partitions 50 that are engaged with the main body 32. Particularly, and as best seen in FIG. 11B, a central partition 60-4 of the second group of partitions 60 is inserted into the central channels 56 of the partitions 50-1, 50-2 of the first group of partitions 50 (denoted by arrow labeled "B2" in FIG. 11B). Such insertion and engagement among central partition 60-4 of the second group of partitions 60 and the partitions 50-1, 50-2 of the first group of partitions 50 defines the third group of compartments 80$c$ along with the first and second groups of compartments 80$a$, 80$b$.

Once the predetermined number of partitions of the second and third group of partitions 60, 70 are removed from the main body 32 and the central partition 60-4 is installed, the operator may then load the magazine 30 with a suitable number of countermeasure expendables. As best seen in FIG. 11C, the operator may load the first group of countermeasure expendables 7$a$ into the first group of compartments 80$a$ where the dimensions of each countermeasure expendable of the first group of countermeasure expendables 7$a$ matches with the dimensions of each compartment of the first group of compartments 80$a$. Similarly, and as best seen in FIG. 10B, the operator may also load the second group of countermeasure expendables 7$b$ into the second group of compartments 80$b$ where the dimensions of each countermeasure expendable of the second group of countermeasure expendables 7$b$ matches with the dimensions of each compartment of the second group of compartments 80$b$. The operator may also load a third group of countermeasure expendables 7$c$ into the third group of compartments 80$c$ where the dimensions of each countermeasure expendable of the third group of countermeasure expendables 7$c$ matches with the dimensions of each compartment of the third group of compartments 80$c$. Once the expendables 7$a$, 7$b$, 7$c$ are loaded, a retaining plate or retainer may be engaged with the main body 32 to secure the expendables 7$a$, 7$b$, 7$c$ and the set of partitions 40 inside of the main body 32. Such use of the retaining plate prevents the expendables 7$a$, 7$b$, 7$c$ and the set of partitions 40 from exiting the main body 32 as the expendables 7$a$, 7$b$, 7$c$, the magazine 30, and the set of partitions 40 are loaded into the platform 1.

At this stage, the operator may then load the set of countermeasure expendables 7$a$, 7$b$, 7$c$, the magazine 30, and the set of partitions 40, collectively, into the main body 22 of the dispenser assembly 20 that is installed with the main body 2 of platform 1. Once the set of countermeasure expendables 7$a$, 7$b$, 7$c$, the main body 32, and the set of partitions 40 are loaded inside of the main body 22, the connector 34 may then be installed with the main body 32 to releasably engage the magazine 30 (along with the set of countermeasure expendables 7$a$, 7$b$, 7$c$ and the set of partitions 40) with the main body 22.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. As another example, "at least one of: A, B, or B" is intended to cover A, B, C, A-B, A-C, B-C, and A-B-C, as well as any combination with multiple of the same item.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A modular magazine of a countermeasure dispensing system, comprising:

a main body;

a pair of horizontal walls of the main body;

a pair of vertical walls of the main body that extends between the pair of horizontal walls;

a set of first grooves defined in the pair of horizontal walls of the main body;

a set of second grooves defined in the pair of vertical walls of the main body, each groove of the set of second grooves being defined by a pair of lateral walls that are spaced apart from and are parallel to one another and extend into the respective vertical wall from an interior surface of the main body to a base wall, and a stop proximate to a front wall of the main body;

a set of partitions removably engageable with the main body at the set of first grooves and the set of second grooves, the set of partitions comprising a first group of partitions removably engageable with the set of first grooves and a second group of partitions removably engageable with the set of second grooves and removably engageable with a partition of the first group of partitions, wherein each partition of the first group of partitions defines a first set of channels and a second set of channels, each channel of the first set of channels and the second set of channels being accessible at a rear end of the partition and being defined by a pair of lateral walls that are spaced apart from and parallel to one another and extend into the partition to a base wall and a stop proximate to a front end of the partition, wherein each partition of the second group of partitions defines a pair of central slots, each central slot being accessible at a rear end of the partition and being defined by a pair of lateral walls that are parallel to one another and spaced apart from one another and extend into the partition to a base wall and a stop proximate to a front end of the partition, and wherein each partition of the second group of partitions defines a pair of notches, wherein a first notch of the pair of notches receives the stop positioned inside a groove of the set of second grooves to prevent the partition of the second group of partitions from exiting through a front end of the main body and a second notch of the pair of notches receives the stop positioned inside a channel of the first set of channels or the second set of channels to prevent the partition of the second group of partitions from exiting through a front end of the partition of the first group of partitions and;

wherein the main body and the set of partitions collectively define a set of compartments configured to receive a set of countermeasure expendables inside of the main body.

2. The modular magazine of claim 1, wherein the set of compartments is collectively defined by the pair of horizontal walls, the pair of vertical walls, and the set of partitions.

3. The modular magazine of claim 2, wherein each compartment of the set of compartments defines a same width and a same height.

4. The modular magazine of claim 2, further comprising:

a first group of compartments of the set of compartments, wherein each compartment of the first group of compartments is defined by a first width and a first height; and a second group of compartments of the set of compartments, wherein each compartment of the second group of compartments is defined by a second width this greater than the first width and a second height that is equal to the first height.

5. The modular magazine of claim 2, further comprising:

a first group of compartments of the set of compartments, wherein each compartment of the first group of compartments is defined by a first width and a first height;

a second group of compartments of the set of compartments, wherein each compartment of the second group of compartments is defined by a second width this greater than the first width and a second height that is equal to the first height; and a third group of compartments of the set of compartments, wherein each compartment of the third group of compartments is defined by a third width this greater than the second width and a third height that is greater than the second height.

6. The modular magazine of claim 1, wherein the first group of partitions is removably engageable with the main body at the set of first grooves.

7. The modular magazine of claim 6, wherein the second group of partitions is removably engageable with the main body at the set of second grooves.

8. The modular magazine of claim 1, wherein the main body is formed of fiberglass.

9. A modular magazine of a countermeasure dispensing system, comprising:

a main body;

a pair of horizontal walls of the main body;

a pair of vertical walls of the main body that extends between the pair of horizontal walls;

a set of first grooves defined in the pair of horizontal walls of the main body;

a set of second grooves defined in the pair of vertical walls of the main body, each groove of the set of second grooves being defined by a pair of lateral walls that are spaced apart from and are parallel to one another and extend into the respective vertical wall from an interior surface of the main body to a base wall, and a stop proximate to a front wall of the main body;

at least one divider fixedly engaged with the pair of horizontal walls or the pair of vertical walls, wherein the at least one divider defines a set of channels for receiving and engaging with one or more partitions of the set of partitions:

a set of partitions removably engageable with the main body at one or more of the set of first grooves, the set of second grooves, and the set of channels of the at least one divider, the set of partitions comprising a first group of partitions removably engageable with the set of first grooves and a second group of partitions removably engageable with the set of second grooves and removably engageable with a partition of the first group of partitions, wherein each partition of the first group of partitions defines a first set of channels and a second set of channels, each channel of the first set of channels and the second set of channels being accessible at a rear end of the partition and being defined by a pair of lateral walls, that are spaced apart from and parallel to one another and extend into the partition to a base wall and a stop proximate to a front end of the partition, wherein each partition of the second group of partitions defines a pair of central slots, each central slot being accessible at a rear end of the partition and being defined by a pair of lateral walls that are parallel to one another and spaced apart from one another and extend into the partition to a base wall and a stop proximate to a front end of the partition, and wherein each partition of the second group of partitions defines a pair of notches, wherein a first notch of the pair of notches receives the stop positioned inside a groove of the set of second grooves to prevent the partition of the second group of partitions from exiting through a front end of the main body and a second notch of the pair of notches receives the stop positioned inside a channel of the first set of channels or the second set of channels to prevent the partition of the second group of partitions from exiting through a front end of the partition of the first group of partitions; and;

wherein the main body and set of partitions collectively define a set of compartments configured to receive a set of countermeasure expendables inside of the main body.

10. The modular magazine of claim 9, wherein the set of compartments is collectively defined by the pair of horizontal walls, the pair of vertical walls, and the set of partitions.

11. The modular magazine of claim 10, wherein each compartment of the set of compartments defines a same width and a same height.

12. The modular magazine of claim 10, further comprising:

a first group of compartments of the set of compartments, wherein each compartment of the first group of compartments is defined by a first width and a first height; and a second group of compartments of the set of compartments, wherein each compartment of the second group of compartments is defined by a second width this greater than the first width and a second height that is equal to the first height.

13. The modular magazine of claim 10, further comprising:

a first group of compartments of the set of compartments, wherein each compartment of the first group of compartments is defined by a first width and a first height;

a second group of compartments of the set of compartments, wherein each compartment of the second group of compartments is defined by a second width this greater than the first width and a second height that is equal to the first height; and a third group of compartments of the set of compartments, wherein each compartment of the third group of compartments is defined by a third width this greater than the second width and a third height that is greater than the second height.

14. The modular magazine of claim 9, wherein the first group of partitions is removably engageable with the main body at the set of first grooves.

15. The modular magazine of claim 14, wherein the second group of partitions is removably engageable with the main body at the set of second grooves.

16. The modular magazine of claim 9, wherein the main body is formed of fiberglass.

17. A modular magazine kit for a countermeasure system, comprising:

a main body;

a pair of horizontal walls of the main body;

a pair of vertical walls of the main body that extends between the pair of horizontal walls;

a set of first grooves defined in the pair of horizontal walls of the main body;

a set of second grooves defined in the pair of vertical walls of the main body, each groove of the set of second grooves being defined by a pair of lateral walls that are spaced apart from and are parallel to one another and extend into the respective vertical wall from an interior surface of the main body to a base wall, and a stop proximate to a front wall of the main body;

a set of partitions removably engageable with the main body at the set of first grooves and the set of second grooves, the set of partitions comprising a first group of partitions removably engageable with the set of first grooves and a second group of partitions removably engageable with at least the set of second grooves and removably engageable with a partition of the first group of partitions, wherein each partition of the first group of partitions defines a first set of channels and a second set of channels, each channel of the first set of channels and the second set of channels being accessible at a rear end of the partition and being defined by a pair of lateral walls that are spaced apart from and parallel to one another and extend into the partition to a base wall and a stop proximate to a front end of the partition, wherein each partition of the second group of partitions defines a pair of central slots, each central slot being accessible at a rear end of the partition and being defined by a pair of lateral walls that are parallel to one another and spaced apart from one another and extend into the partition to a base wall and a stop proximate to a front end of the partition, and wherein each partition of the second group of partitions defines a pair of notches, wherein a first notch of the pair of notches receives the stop positioned inside a groove of the set of second grooves to prevent the partition of the second group of partitions from exiting through a front end of the main body and a second notch of the pair of notches receives the stop positioned inside a channel of the first set of channels or the second set of channels to prevent the partition of the second group of partitions from exiting through a front end of the partition of the first group of partitions; and wherein, when assembled, the main body and the set of partitions collectively define a set of compartments configured to receive a set of countermeasure expendables inside of the main body.

18. The modular magazine kit of claim 17, wherein the first group of partitions is removably engageable with the main body at the set of first grooves.

19. The modular magazine kit of claim 18, wherein the second group of partitions is removably engageable with the main body at the set of second grooves.

20. The modular magazine kit of claim 17, wherein the main body is formed of fiberglass.

* * * * *